(12) United States Patent
Kaji

(10) Patent No.: US 8,170,735 B2
(45) Date of Patent: *May 1, 2012

(54) MARINE VESSEL MANEUVERING SUPPORTING APPARATUS AND MARINE VESSEL INCLUDING THE SAME

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 500 days.

This patent is subject to a terminal disclaimer.

(21) Appl. No.: 12/493,368

(22) Filed: Jun. 29, 2009

(65) Prior Publication Data

US 2010/0145558 A1 Jun. 10, 2010

(30) Foreign Application Priority Data

Dec. 4, 2008 (JP) ................................. 2008-309862

(51) Int. Cl.
*B60L 3/00* (2006.01)
(52) U.S. Cl. ...................................... 701/21; 114/144 R
(58) Field of Classification Search .................... 701/21; 114/144 R; 440/84
See application file for complete search history.

(56) References Cited

U.S. PATENT DOCUMENTS

| | | | | |
|---|---|---|---|---|
| 6,298,824 B1 * | 10/2001 | Suhre | ........................ | 123/406.49 |
| 6,738,708 B2 * | 5/2004 | Suzuki et al. | ................. | 701/110 |
| 6,855,020 B2 * | 2/2005 | Kaji | ................................. | 440/84 |
| 6,884,128 B2 * | 4/2005 | Okuyama et al. | ................. | 440/1 |
| 6,994,046 B2 * | 2/2006 | Kaji et al. | ................. | 114/144 R |
| 7,280,904 B2 * | 10/2007 | Kaji | .............................. | 701/101 |
| 7,677,937 B2 * | 3/2010 | Ishida et al. | ...................... | 440/1 |
| 7,736,204 B2 * | 6/2010 | Kaji | ................................. | 440/1 |
| 2007/0017426 A1 | 1/2007 | Kaji et al. | | |

FOREIGN PATENT DOCUMENTS

JP 02-227395 A 9/1990

OTHER PUBLICATIONS

Hirotaka: "Marine Vessel Maneuvering Supporting Apparatus and Marine Vessel Including the Same"; U.S. Appl. No. 12/493,365, filed Jun. 29, 2009.

* cited by examiner

*Primary Examiner* — Gertrude Arthur Jeanglaude
(74) *Attorney, Agent, or Firm* — Keating & Bennett, LLP

(57) ABSTRACT

A marine vessel maneuvering supporting apparatus is used in a marine vessel which includes a propulsion system and a steering mechanism. The marine vessel maneuvering supporting apparatus includes a first operational unit arranged select a forward drive position for forward drive of the propulsion system, a reverse drive position for reverse drive of the propulsion system, and a neutral position for an inactive state of the propulsion system, a second operational unit arranged to command rightward and leftward movement of the marine vessel, and a target value computing unit arranged to determine target values including a target propulsive force for the propulsion system and a target steering angle for the steering mechanism, such that the marine vessel undergoes parallel movement in a direction that is in accordance with an operation position of the first operational unit when rightward or leftward movement is commanded by the second operational unit.

18 Claims, 10 Drawing Sheets

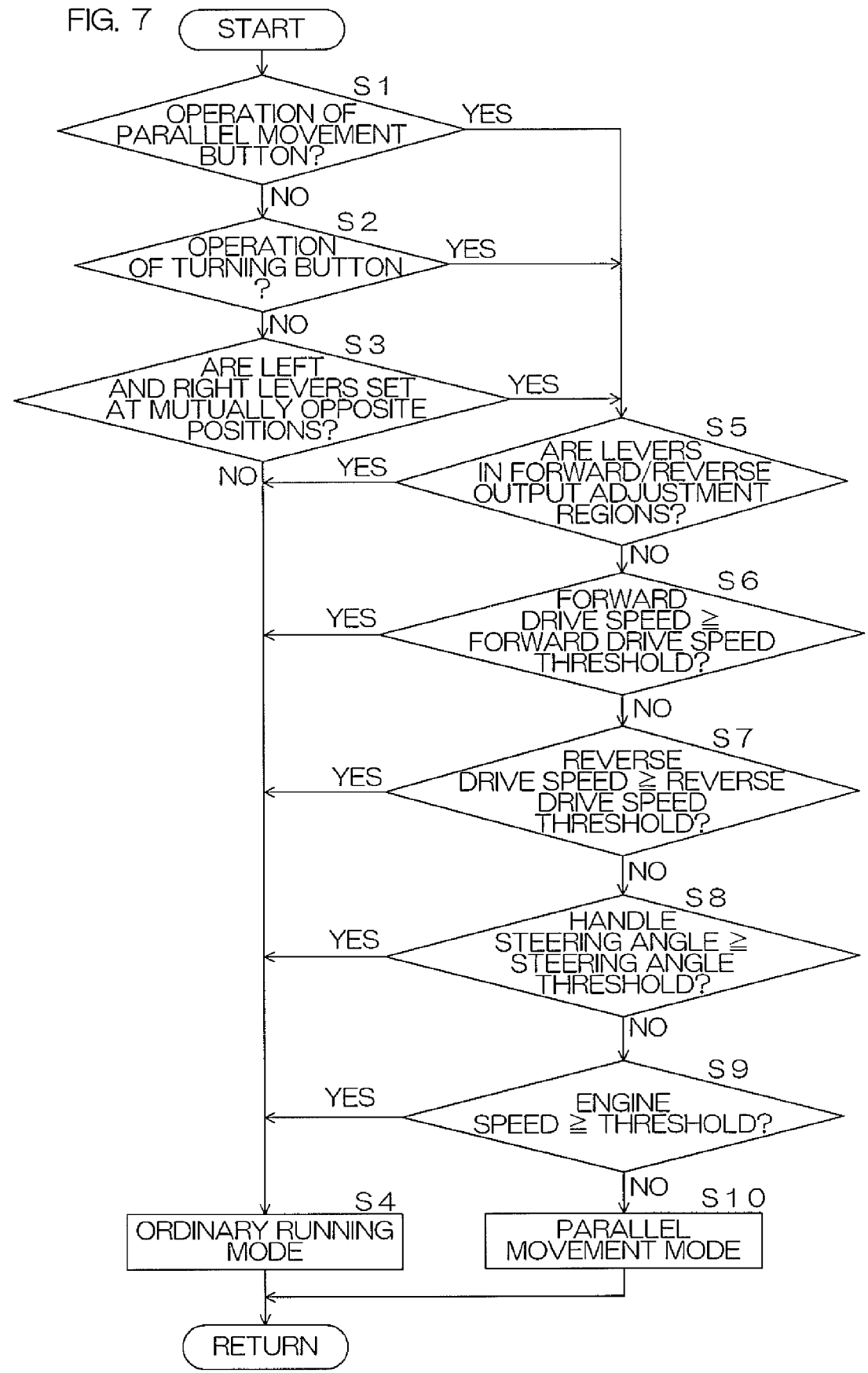

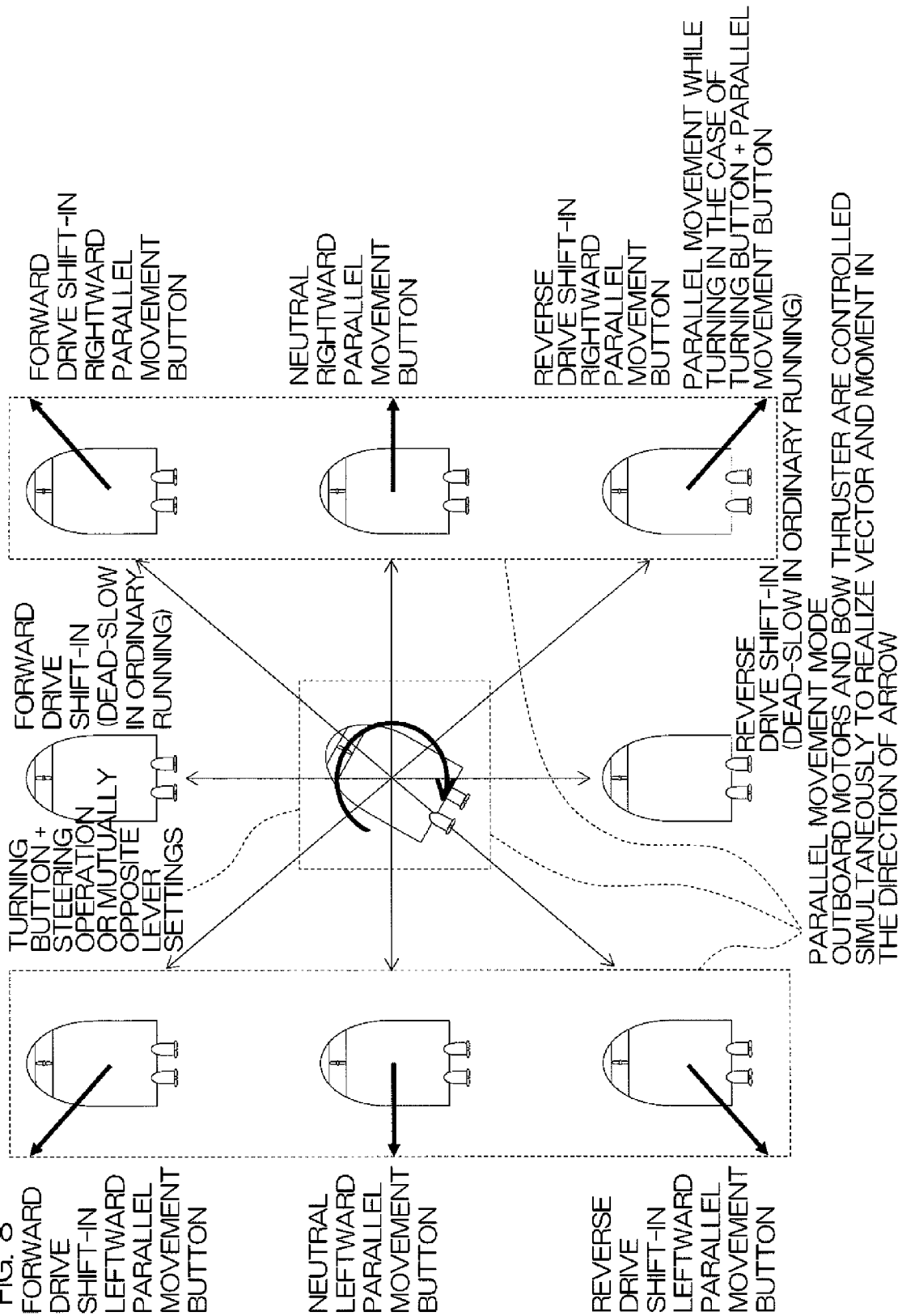

WHEN TURNING BUTTON IS PRESSED WITH Lz=0°

WHEN TURNING BUTTON IS PRESSED WITH Lz=45°

WHEN TURNING BUTTON IS PRESSED WITH Lz=135°

MARINE VESSEL MANEUVERING SUPPORTING APPARATUS AND MARINE VESSEL INCLUDING THE SAME

BACKGROUND OF THE INVENTION

1. Field of the Invention

The present invention relates to a marine vessel, which includes a propulsion system and a steering mechanism, and a marine vessel maneuvering supporting apparatus for such a marine vessel.

2. Description of the Related Art

There has been proposed a marine vessel maneuvering supporting apparatus that can make a marine vessel move laterally without rotating by controlling outputs and steering angles of a pair of outboard motors disposed on a stern of the marine vessel (see, for example, U.S. Patent Application Publication No. 2007/0017426A1). With this marine vessel maneuvering supporting apparatus, a control mode is switched from an ordinary running mode to a marine vessel maneuvering support mode for anchoring when a marine vessel maneuvering support starting button for anchoring is operated. In the marine vessel maneuvering support mode for anchoring, the marine vessel can be made to move laterally in forward, reverse, rightward and leftward directions by operation of a cross button. Marine vessel maneuvering during launching from and docking on shore is thereby facilitated. During ordinary maneuvering other than lateral movement, an operator of the marine vessel operates a steering handle to control the steering angles and operates a remote control lever to control the outboard motor outputs.

The steering angles of the pair of outboard motors are set equal to each other in the ordinary running mode. On the other hand, in the marine vessel maneuvering support mode for anchoring, the propulsive forces and the steering angles of the respective outboard motors are determined such that a direction of a resultant force of the propulsive forces generated by the pair of outboard motors matches an intended direction of movement. The steering angles of the pair of outboard motors thus generally take on different values in the marine vessel maneuvering support mode for anchoring. For example, to make the marine vessel move laterally at a right angle, one propulsive force direction of one of the outboard motors is set obliquely forward and the other propulsive force direction of one of the outboard motors is set obliquely in the reverse direction.

SUMMARY OF THE INVENTION

Near a pier, the operator performs maneuvering for launching from and docking on shore while avoiding other marine vessels close by. Lateral movement maneuvering using the cross button is convenient for this purpose. On the other hand, lateral movement maneuvering is no longer needed when the marine vessel has moved away from the pier and distances to nearby vessels have increased. In the marine vessel maneuvering support mode for anchoring, parallel movement of the marine vessel is achieved by mutual cancellation of the propulsive forces of the respective propulsion systems. A high engine speed must thus be maintained even in low speed movement. Thus, in a circumstance in which maneuvering in the ordinary running mode is possible, better energy efficiency is achieved by not using the marine vessel maneuvering support mode for anchoring.

In transitioning from the marine vessel maneuvering support mode for anchoring to the ordinary running mode, an exchange from the lateral movement operational system, which includes the cross button, to the ordinary operational system, which includes the steering handle and the remote control lever, must be performed. Oppositely, in transitioning from the ordinary running mode to the marine vessel maneuvering support mode for anchoring, an exchange from the ordinary operational system to the lateral movement operational system must be performed. Especially, during launching from and docking on shore, the operator is forced to switch the control mode frequently while the marine vessel is moving near a pier. Accordingly, the operator is forced to exchange the operational systems frequently. However, frequent exchange of the operational systems is troublesome.

Also, since both the ordinary operational system and the lateral movement operational system must be prepared, the operational system configuration is complex and the cost is accordingly high. Furthermore, in a small-scale marine vessel, it is not easy to install two types of operational systems in a small vessel maneuvering space.

In order to overcome the problems mentioned above, a preferred embodiment of the present invention provides a marine vessel maneuvering supporting apparatus including a first operational unit arranged to select of a forward drive position for forward drive of a propulsion system, a reverse drive position for reverse drive of the propulsion system, and a neutral position for an inactive state of propulsion system, a second operational unit arranged to command rightward and leftward movement of the marine vessel, and a target value computing unit arranged to determine target values including a target propulsive force for the propulsion system and a target steering angle for a steering mechanism, such that the marine vessel undergoes parallel movement in a direction that is in accordance with an operation position of the first operational unit when rightward or leftward movement is commanded by the second operational unit.

"Parallel movement" refers to a movement state in which a center (for example, an instantaneous center of rotation) of the marine vessel moves rectilinearly.

With this configuration, during ordinary running, the action of the propulsion system can be controlled according to an operator's operation of the first operational unit. On the other hand, when rightward or leftward movement is commanded by the second operational unit, the target values including the target propulsive force and the target steering angle are computed such that the marine vessel undergoes parallel movement in the direction that is in accordance with the operation position of the first operational unit. The marine vessel can be made to undergo parallel movement in such direction by the propulsion system and the steering mechanism being controlled according to the target values. The first operational unit can thus be used in common during ordinary running and during parallel movement, thereby enabling the trouble of exchanging the operational system to be eliminated. Because the operational system can be used in common for ordinary running and parallel movement, the overall configuration of the operational system is simplified and the cost can be reduced accordingly. Further, the installation space for the operational system is reduced.

Preferably, a control unit is further included that controls the propulsion system and the steering mechanism according to the target values determined by the target value computing unit. Such a control unit may be disposed in the marine vessel maneuvering supporting apparatus or in the propulsion system and the steering mechanism.

Preferably, a steering handle, operable for controlling a steering angle of the steering mechanism, is further included. In this case, the target value computing unit preferably has an ordinary running mode, in which the target values are determined according to operation positions of the steering handle and the first operational unit, and a parallel movement mode, in which the target values for parallel movement in the direction that is in accordance with the operation position of the first operational unit is determined when rightward or leftward movement is commanded by the second operational unit. More specifically, the target value computing unit may include a first target value computing unit (module) arranged to compute the target values for the ordinary running mode, a second target value computing unit (module) arranged to compute the target values for the parallel movement mode, and a switching unit arranged to select either the ordinary running mode or the parallel movement mode. In this case, the switching unit may include a selecting unit that selects one target value computing unit among the first and second target value computing units. The selecting unit may be a selecting and outputting unit that selects one target value computing unit among the first and second target value computing units and outputs the computation results of that target value computing unit. The selecting unit may be a selecting and activating unit that selects and activates one target value computing unit from among the first and second target value computing units.

In a preferred embodiment, the second operational unit includes a leftward movement operational element used for commanding movement in a leftward direction and a rightward movement operational element used for commanding movement in a rightward direction, and the target value computing unit determines the target values for parallel movement in a direction that is in accordance with a combination of operations of the leftward movement operational element and the rightward movement operational element and the operation position of the first operational unit.

With this configuration, several target movement directions can be set according to the combination of the operation positions of the leftward movement operational element, the rightward movement operational element, and the first operational unit, and the marine vessel can be made to undergo parallel movement in any of these target movement directions.

An example of settings of the target movement direction is shown below. However, items (4) to (6) are states in which neither of the rightward and leftward movement operational elements is operated (OFF state) and thus correspond to operations that are in accordance with the ordinary running mode.

TABLE 1

| | Leftward movement operational element | Rightward movement operational element | First operational unit | Target movement direction |
| --- | --- | --- | --- | --- |
| (1) | ON | OFF | Forward drive position | Diagonally forward left |
| (2) | ON | OFF | Neutral position | Left |
| (3) | ON | OFF | Reverse drive position | Diagonally backward left |
| (4) | OFF | OFF | Forward drive position | Forward |
| (5) | OFF | OFF | Neutral position | Stopped |
| (6) | OFF | OFF | Reverse drive position | Backward |
| (7) | OFF | ON | Forward drive position | Diagonally forward right |
| (8) | OFF | ON | Neutral position | Right |
| (9) | OFF | ON | Reverse drive position | Diagonally backward right |

A marine vessel maneuvering supporting apparatus according to a preferred embodiment generates target values corresponding to a pair of right and left propulsion systems and a pair of steering mechanisms, which respectively correspond to the propulsion systems. In this case, the first operational unit may include a left operational element corresponding to the left propulsion system and a right operational element corresponding to the right propulsion system. The left operational element and the right operational element may respectively be operable to a forward drive position, a reverse drive position, and a neutral position. Preferably in this case, the target value computing unit determines target values for turning the marine vessel on the spot when the operation positions of the left operational element and the right operational element are a combination of the forward drive position and the reverse drive position. The expression "operation positions of the left operational element and the right operational element are a combination of the forward drive position and the reverse drive position" includes both of the following operation states A and B:

A. The left operational element is in the forward drive position and the right operational element is in the reverse drive position.

B. The left operational element is in the reverse drive position and the right operational element is in the forward drive position.

With the above configuration, when the left movement operational element and the right movement operational element of the first operational unit are set to operation positions that command driving in opposite directions, the marine vessel turns on the spot. The operational system for ordinary running can thereby be used in common for turning on the spot.

For example, when the left operational element is in the forward drive position and the right operational element is in the reverse drive position, the target values for rightward turning are set, and when the left operational element is in the reverse drive position and the right operational element is in the forward drive position, the target values for leftward turning are set.

In a preferred embodiment, when the operation amount from the neutral position of the first operational unit exceeds a predetermined amount, the target value computing unit invalidates the command by the second operational unit and determines the target values according to the operational amount of the first operational unit.

With this configuration, when the first operational unit is operated by a large amount from the neutral position, it is deemed that an operation for ordinary operation is performed and the setting of parallel movement mode by the second operational unit is invalidated. The computing mode is thereby set to the ordinary running mode.

For example, the operation position of the first operational unit may be set at the neutral position, at a minimum forward drive propulsive force command position (forward drive shift-in position), in a forward drive output adjustment region, at a minimum reverse drive propulsive force command position (reverse drive shift-in position), or in a reverse drive output adjustment region. The minimum forward drive propulsive force command position is an operation position at which a minimum propulsive force in the forward drive direction is generated. The forward drive output adjustment region is a forward drive side operation region beyond the minimum forward drive propulsive force command position and is a region in which the propulsive force in the forward drive direction can be adjusted according to the operation position within a range in which the propulsive force is greater than the minimum forward drive propulsive force. Likewise, the minimum reverse drive propulsive force command position is an operation position at which a minimum propulsive force in the reverse drive direction is generated. The reverse drive output adjustment region is a reverse drive side operation region beyond the minimum reverse drive propulsive force command position and is a region in which the propulsive force in the reverse drive direction can be adjusted according to the operation position within a range in which the propulsive force is greater than the minimum reverse drive propulsive force. In this case, the second operational unit (parallel movement mode) maybe invalidated in the forward drive output adjustment region and the reverse drive output adjustment region. The forward drive position and the reverse drive position for parallel movement thus correspond respectively to the minimum forward drive propulsive force command position and the minimum reverse drive propulsive force command position.

To facilitate recognition of the operation position, an operation position provisional holding unit that is arranged to provisionally hold the operation position at the neutral position, the minimum forward drive propulsive force command position, and the minimum reverse drive propulsive force command position is preferably provided. The operation position provisional holding unit may have a structure that uses notches to provisionally hold a movable member that moves along with an operational element.

A marine vessel maneuvering supporting apparatus according to a preferred embodiment further includes a speed detecting unit that detects a speed of the marine vessel. In this case, the target value computing unit preferably determines the target values upon invalidating the command by the second operational unit when the speed of the marine vessel detected by the speed detecting unit is not less than a predetermined speed threshold.

With this configuration, when the speed of the marine vessel exceeds the speed threshold, the marine vessel is judged to be in the ordinary running state and the operation of the second operational unit is invalidated. Transition to the parallel movement mode is thus prohibited. An uncomfortable feeling that accompanies transition to the parallel movement mode under a circumstance in which the speed of the marine vessel is high can thus be alleviated.

A marine vessel maneuvering supporting apparatus according to a preferred embodiment further includes a turning operational unit used for making the marine vessel turn during parallel movement of the marine vessel. Preferably in this case, when the rightward or leftward movement is commanded by the second operational unit, the target value computing unit determines the target values such that the marine vessel turns while undergoing parallel movement in the direction that is in accordance with the operation position of the first operational unit. With this configuration, the marine vessel can be made to turn during parallel movement.

The turning operational unit may be disposed on a steering handle used for controlling the steering angle of the steering mechanism.

With this configuration, turning can be commanded by operation of the turning operational unit disposed on the steering handle. The operation for turning can thereby be performed while holding the steering handle that is used for adjusting the steering angle during ordinary running.

The target value computing unit may determine a target turning value during parallel movement in accordance with the operation amount of the steering handle (or more specifically, a relative steering amount) and determine target values according to the target turning value. The target turning value may be a target yaw moment amount or a target yaw angular speed around an instantaneous center of the marine vessel.

With this configuration, by operating the turning operational unit disposed on the steering handle and further operating the steering handle, the marine vessel can be made to turn according to the operation amount. The steering handle that is used for adjusting the steering angle during ordinary running can thus be used in common for turning control during parallel movement.

Still further, the target value computing unit may invalidate the command by the turning operational unit when the handle steering angle of the steering handle is not less than a predetermined steering angle threshold.

With this configuration, setting of an excessive target turning value can be avoided because the turning operation is invalidated when the handle steering angle is not less than the predetermined steering angle threshold. For example, arrangements can be made such that the ordinary running mode is maintained and transition to the parallel movement mode is not performed when the handle steering angle is not less than the predetermined steering angle threshold. This is so because it can be considered that when the handle steering angle is large, the operator desires ordinary running and not parallel movement.

A preferred embodiment of the present invention provides a marine vessel that includes a hull, a propulsion system and a steering mechanism attached to the hull, and the above-described marine vessel maneuvering supporting apparatus that is arranged to determine the target values for the propulsion system and the steering mechanism.

With this configuration, exchanging of the operational system is made unnecessary because the operational unit for ordinary running can be used in common in parallel movement as well. Operation is thus simplified. Further, the configuration of the operational system is simplified and the cost of the marine vessel as a whole can thus be reduced. The installation space for the operational system is also reduced, and excellent operability can thus be secured even in a small-scale marine vessel.

The marine vessel may preferably be a relatively small-scale marine vessel such as a cruiser, a fishing boat, a water jet or a watercraft, for example.

The propulsion system included in the marine vessel may preferably be in the form of an outboard motor, an inboard/outboard motor (a stern drive or an inboard motor/outboard drive), an inboard motor, a water jet drive, or other suitable motor or drive, for example. The outboard motor includes a propulsion unit provided outboard of the vessel and having a motor (engine or electric motor) and a propulsive force generating member (propeller), and a steering mechanism, which horizontally turns the entire propulsion unit with respect to the hull. The inboard/outboard motor includes a motor provided inboard of the vessel, and a drive unit provided outboard and having a propulsive force generating member and a steering mechanism. The inboard motor includes a motor and a drive unit incorporated in the hull, and a propeller shaft extending outboard from the drive unit. In this case, a steering mechanism is separately provided. The water jet drive has a configuration such that water sucked in from the bottom of the marine vessel is accelerated by a pump and ejected from an ejection nozzle provided at the stern of the marine vessel to provide a propulsive force. In this case, the steering mechanism includes the ejection nozzle and a mechanism for turning the ejection nozzle along a horizontal plane.

Other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flowchart for explaining selection of a control mode.

FIG. 8 is a diagram for explaining setting of target values and a behavior of the marine vessel in a parallel movement mode.

DETAILED DESCRIPTION OF THE PREFERRED EMBODIMENTS

Figure 1:
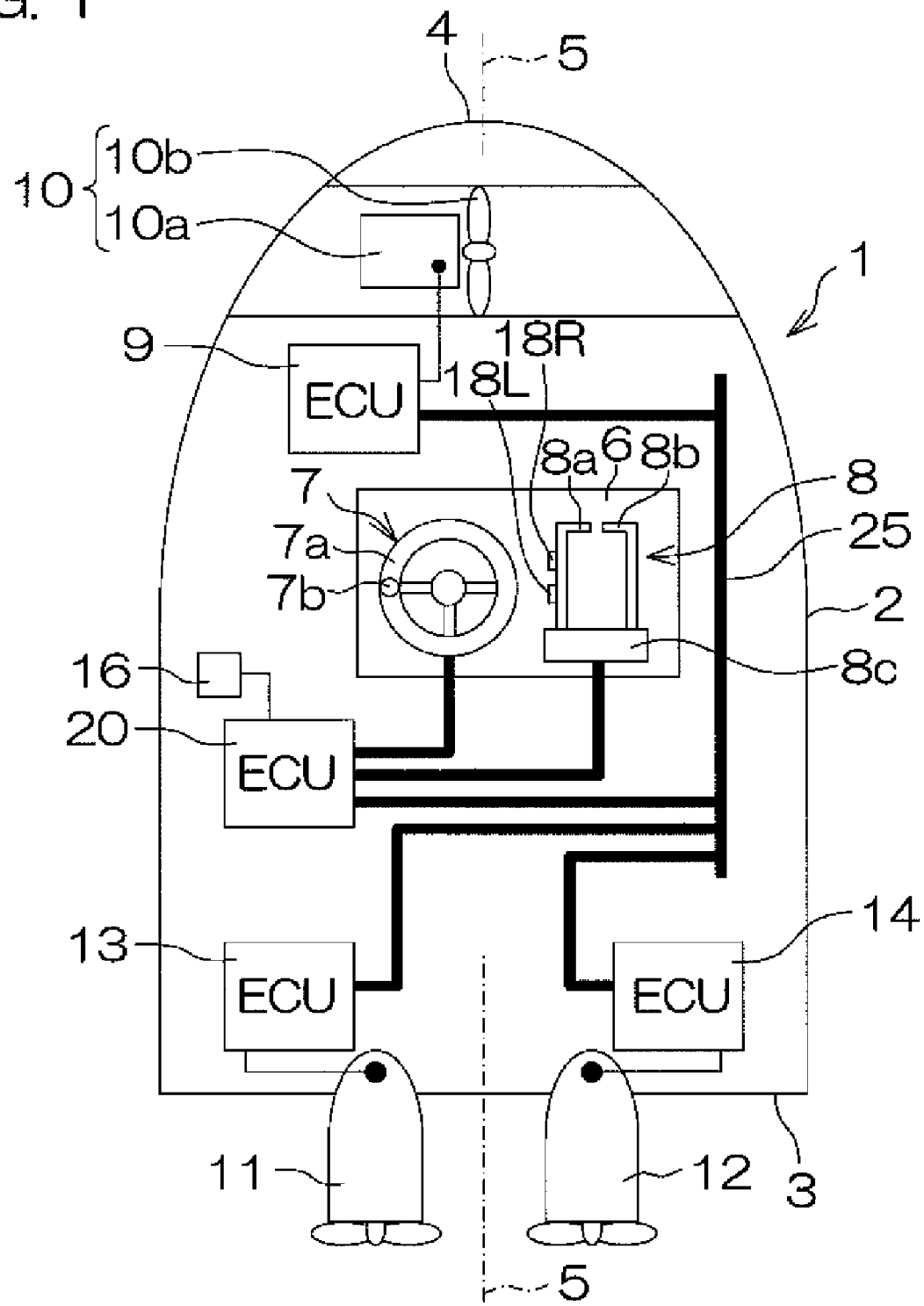
FIG. 1 is a schematic diagram for explaining a configuration of a marine vessel according to a preferred embodiment of the present invention.

FIG. 1 is a schematic diagram for explaining a configuration of a marine vessel 1 according to one preferred embodiment of the present invention. The marine vessel 1 preferably is a relatively small-scale marine vessel, such as a cruiser or a boat, for example. A single bow thruster 10 and a pair of outboard motors 11 and 12 are attached to a hull 2 of the marine vessel 1. The outboard motors 11 and 12 are attached to a stern (transom) 3 of the hull 2. The pair of outboard motors 11 and 12 are attached at right/left symmetrical positions with respect to a central line 5 that passes through the stern 3 and a bow 4 of the hull 2. That is, one outboard motor 11 is attached to a portside rear portion of the hull 2 and the other outboard motor 12 is attached to a starboard side rear portion of the hull 2. Thus, in the following description, in cases where the outboard motors are to be distinguished, the motors shall be referred to as the "portside outboard motor 11" and the "starboard side outboard motor 12." The bow thruster 10 is attached near the bow 4 of the hull 2. The bow thruster 10 is a propulsion unit that generates a propulsion force in a rightward/leftward direction that intersects the central line 5. More specifically, the bow thruster 10 includes an electric motor 10a and a propeller 10b that is driven to rotate forward or in reverse by the electric motor 10a. The propulsive force generated by the propeller 10b is aligned along a horizontal direction (rightward/leftward direction) that intersects (is orthogonal to) the central line of the marine vessel 1. In the following description, the bow thruster 10 and the outboard motors 11 and 12 may be referred to collectively as "propulsion systems 10 to 12," etc.

An electronic control unit (ECU) 9, which controls a rotation direction and a rotation speed of the electric motor 10a, is incorporated in the bow thruster 10. Electronic control units 13 and 14 (hereinafter referred to as "outboard motor ECU 13" and "outboard motor ECU 14") are incorporated in the portside outboard motor 11 and the starboard side outboard motor 12, respectively. However in FIG. 1, the ECUs 9, 13, and 14 are illustrated as being separate from main body portions of the propulsion systems 10 to 12 for the sake of convenience.

A control console 6 for marine vessel maneuvering is disposed at a control compartment of the hull 2. The control console 6 includes, for example, a steering operational section 7 for a steering operation and a throttle operational section 8 for adjusting the outputs of the outboard motors 11 and 12. In the present example, the steering operational section 7 is disposed at a left side and the throttle operational section 8 is disposed at a right side. The steering operational section 7 includes a steering handle 7a as an operational member. The throttle operational section 8 includes throttle levers 8a and 8b, respectively corresponding to the portside outboard motor 11 and the starboard side outboard motor 12. Respective heads of the throttle levers 8a and 8b are bent in mutually approaching directions to form substantially horizontal holding portions. The operator can thus operate both of the throttle levers 8a and 8b at the same time to control the outputs of the outboard motors 11 and 12 while keeping the throttle openings of the portside and starboard side outboard motors 11 and 12 virtually the same. Signals expressing operation amounts of the steering handle 7a and the throttle levers 8a and 8b are input into the marine vessel running controlling apparatus 20.

The marine vessel running controlling apparatus 20 preferably is an electronic control unit (ECU) that includes a microcomputer. The marine vessel running controlling apparatus 20 performs communication with the ECUs 9, 13, and 14 via a LAN (local area network, hereinafter referred to as "inboard LAN") 25 installed inside the hull 2. More specifically, the marine vessel running controlling apparatus 20 acquires rotation speeds of engines included in the outboard motors 11 and 12 from the outboard motor ECUs 13 and 14. In addition, the marine vessel running controlling apparatus 20 is configured to provide data, expressing a target shift position (forward drive, neutral, reverse drive), a target engine speed, and a target steering angle, to the outboard motor ECUs 13 and 14. The marine vessel running controlling apparatus 20 acquires rotation speed information of the propeller 10b from the ECU 9 corresponding to the bow thruster 10. The marine vessel running controlling apparatus 20 provides a target rotation direction and a target rotation speed of the electric motor 10a to the ECU 9 corresponding to the bow thruster 10.

Also, output signal from a speed sensor 16 is input into the marine vessel running controlling apparatus 20. The speed sensor 16 detects a forward drive speed and a reverse drive speed of the marine vessel 1 and outputs a speed signal. The speed sensor 16 may detect water speeds or may detect ground speeds. Specifically, the speed sensor 16 can be configured using a Pitot tube.

The marine vessel running controlling apparatus 20 performs control operations in accordance with a plurality of control modes including an ordinary running mode and a parallel movement mode (marine vessel maneuvering support mode for anchoring).

In the ordinary running mode, the marine vessel running controlling apparatus 20 sets the target steering angles of the outboard motors 11 and 12 to equal values in accordance with the operation of the steering operational section 7. The outboard motors 11 and 12 thus generate propulsive forces in mutually parallel directions. The marine vessel running controlling apparatus 20 also sets the target engine speeds and the target shift positions of the respective outboard motors 11 and 12 in accordance with forward/reverse inclination operation amounts of the throttle levers 8a and 8b. The bow thruster 10 is controlled to be in a stopped state.

In the parallel movement mode, the marine vessel running controlling apparatus 20 makes the marine vessel 1 undergo parallel movement in a target movement direction determined according the operation positions of the throttle levers 8a and 8b and makes the marine vessel 1 turn at a yaw moment that is in accordance with the operation amount of the steering handle 7a. That is, the marine vessel running controlling apparatus 20 sets the target shift positions, the target engine speeds, and the target steering angles of the outboard motors 11 and 12 such that such parallel movement is achieved. The marine vessel running controlling apparatus 20 also sets the target rotation direction and the target rotation speed of the electric motor 10a of the bow thruster 10. In the parallel movement mode, the directions of propulsive forces generated by the portside and starboard side outboard motors 11 and 12 are generally non-parallel.

Figure 2:
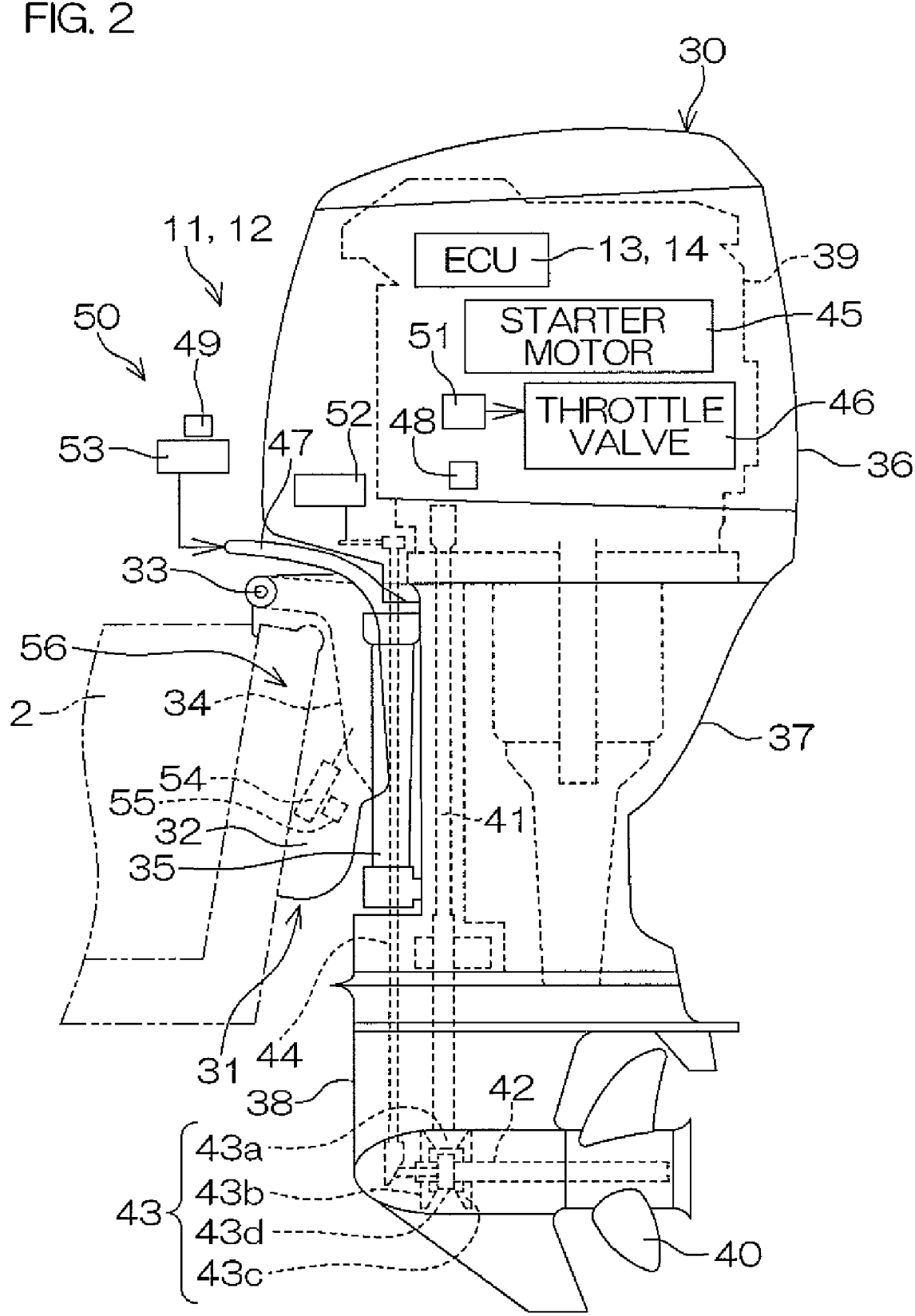
FIG. 2 is a schematic sectional view for explaining a configuration of an outboard motor.

FIG. 2 is a schematic sectional view for explaining a configuration in common to the outboard motors 11 and 12. Each of the outboard motors 11 and 12 includes a propulsion unit 30 and an attachment mechanism 31 for attaching the propulsion unit 30 to the hull 2. The attachment mechanism 31 includes a clamp bracket 32 detachably fixed to the transom of the hull 2, and a swivel bracket 34 connected to the clamp bracket 32 pivotally around a tilt shaft 33 as a horizontal pivot axis. The propulsion unit 30 is attached to the swivel bracket 34 pivotally around a steering shaft 35. The steering angle (which is equivalent to an angle defined by the direction of the propulsive force with respect to the center line 5 of the hull 2) is thus changed by pivoting the propulsion unit 30 around the steering shaft 35. Further, a trim angle of the propulsion unit 30 is changed by pivoting the swivel bracket 34 around the tilt shaft 33. The trim angle corresponds to an attachment angle of each of the outboard motors 11 and 12 with respect to the hull 2.

The propulsion unit 30 has a housing which includes a top cowling 36, an upper case 37, and a lower case 38. An engine 39 is provided as a drive source in the top cowling 36 with an axis line of a crank shaft thereof extending vertically. A drive shaft 41 for power transmission is coupled to a lower end of the crank shaft of the engine 39 and vertically extends through the upper case 37 into the lower case 38.

A propeller 40, serving as a propulsive force generating member, is rotatably attached to a lower rear portion of the lower case 38. A propeller shaft 42, which is a rotation shaft of the propeller 40, extends horizontally in the lower case 38. The rotation of the drive shaft 41 is transmitted to the propeller shaft 42 via a shift mechanism 43 that serves as a clutch mechanism.

The shift mechanism 43 includes a beveled drive gear 43a fixed to a lower end of the drive shaft 41, a beveled forward drive gear 43b rotatably provided on the propeller shaft 42, a beveled reverse drive gear 43c rotatably provided on the propeller shaft 42, and a dog clutch 43d provided between the forward drive gear 43b and the reverse drive gear 43c.

The forward drive gear 43b is meshed with the drive gear 43a from a forward side, and the reverse drive gear 43c is meshed with the drive gear 43a from a reverse side. Therefore, the forward drive gear 43b and the reverse drive gear 43c rotate in opposite directions when the drive gear 43a rotates.

On the other hand, the dog clutch 43d is in spline engagement with the propeller shaft 42. That is, although the dog clutch 43d is axially slidable with respect to the propeller shaft 42, it is not rotatable relative to the propeller shaft 42 and rotates together with the propeller shaft 42.

A shift rod 44, which extends vertically parallel or substantially parallel to the drive shaft 41, rotates around its axis to make the dog clutch 43d slide along the propeller shaft 42. The shift position of the dog clutch 43d is thereby controlled to be set at a forward drive position at which it is engaged with the forward drive gear 43b, at a reverse drive position at which it is engaged with the reverse drive gear 43c, or at a neutral position at which it is not engaged with either the forward drive gear 43b or the reverse drive gear 43c.

When the dog clutch 43d is in the forward drive position, the rotation of the forward drive gear 43b is transmitted to the propeller shaft 42 via the dog clutch 43d. Thus, the propeller 40 is rotated in one direction (forward drive direction) to generate a propulsive force in a direction for moving the hull 2 forward. On the other hand, when the dog clutch 43d is in the reverse drive position, the rotation of the reverse drive gear 43c is transmitted to the propeller shaft 42 via the dog clutch 43d. The reverse drive gear 43c is rotated in a direction opposite to that of the forward drive gear 43b. Therefore, the propeller 40 is rotated in an opposite direction (reverse drive direction) to generate a propulsive force in a direction for moving the hull 2 in reverse. When the dog clutch 43d is in the neutral position, the rotation of the drive shaft 41 is not transmitted to the propeller shaft 42. That is, the transmission pathway of a driving force between the engine 39 and the propeller 40 is blocked so that no propulsive force is generated in either of the forward and reverse directions.

In association with the engine 39, a starter motor 45 is provided for starting the engine 39. The starter motor 45 is controlled by the corresponding outboard motor ECU 13 or 14. The propulsion unit 30 further includes a throttle actuator 51 arranged to actuate a throttle valve 46 of the engine 39 in order to change the throttle opening degree to change the intake air amount of the engine 39. The throttle actuator 51 maybe an electric motor, for example. The operation of the throttle actuator 51 is controlled by the corresponding outboard motor ECU 13 or 14. Furthermore, an engine speed detecting unit 48 is provided to detect the rotation speed of the engine 39 by detection of the rotation of the crankshaft.

A shift actuator 52 (clutch actuator) is arranged to change the shift position of the dog clutch 43d. The shift actuator 52 preferably includes, for example, an electric motor, and the operation thereof is controlled by the corresponding outboard motor ECU 13 or 14.

Further, a steering actuator 53 which is controlled by the corresponding outboard motor ECU 13 or 14, is connected to the steering rod 47 fixed to the propulsion unit 30. For example, the steering actuator 53 may include a DC servo motor and a speed reducer. By driving the steering actuator 53, the propulsion unit 30 is pivoted around the steering shaft 35 for the steering operation. The steering actuator 53, the steering rod 47 and the steering shaft 35 define a steering mechanism 50 (electric steering apparatus). The steering mechanism 50 includes a steering angle sensor 49 for detecting the steering angle. The steering angle sensor 49 preferably includes, for example, a potentiometer.

A trim actuator (tilt trim actuators) 54, which includes, for example, a hydraulic cylinder and is controlled by the corresponding outboard motor ECU 13 or 14, is provided between the clamp bracket 32 and the swivel bracket 34. The trim actuator 54 pivots the propulsion unit 30 around the tilt shaft 33 by pivoting the swivel bracket 34 around the tilt shaft 33. A trim mechanism 56 is arranged to change the trim angle of the propulsion unit 30. The trim angle is detected by a trim angle sensor 55. An output signal of the trim angle sensor 55 is input into the corresponding outboard motor ECU 13 or 14.

Figure 3:
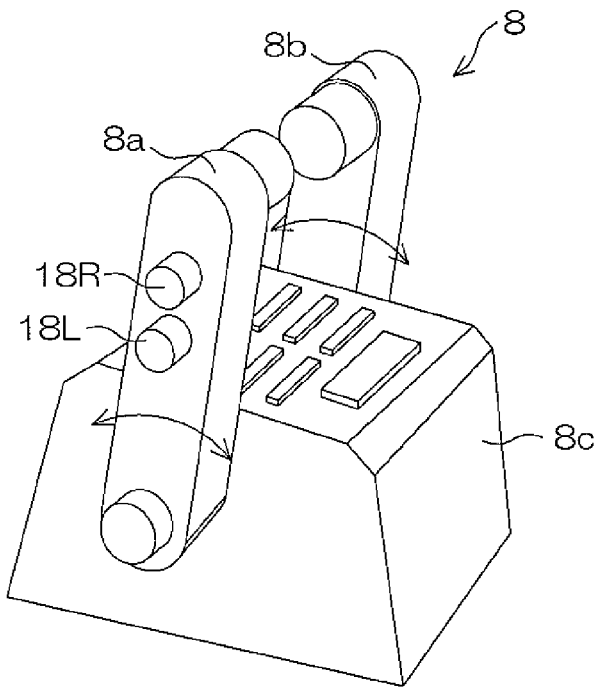
FIG. 3 is an enlarged perspective view of a configuration of a throttle operational section.

FIG. 3 is an enlarged perspective view of a configuration of the throttle operational section 8. The throttle operational section 8 includes a box-shaped main body 8c and the pair of throttle levers 8a and 8b. The throttle levers 8a and 8b are attached to a pair of opposing side surfaces of the main body 8c. The throttle levers 8a and 8b are respectively capable of swinging within predetermined angular ranges in the forward/rearward direction. In the ordinary running mode, the left side throttle lever 8a is used for output control of the portside outboard motor 11. Likewise, the right side throttle lever 8b is used for output control of the starboard side outboard motor 12. A leftward parallel movement button 18L and a rightward parallel movement button 18R are disposed on the throttle lever 8a (at the left side in the present preferred embodiment). The buttons 18L and 18R preferably are push buttons that can be depressingly operated by the operator. In the present preferred embodiment, the leftward parallel movement button 18L is disposed below the rightward parallel movement button 18R. Both parallel movement buttons 18L and 18R are disposed at positions enabling depressing by a thumb of the operator when the throttle levers 8a and 8b are held by the right hand of the operator. Signals expressing operation or non-operation of the parallel movement buttons 18L and 18R are provided to the marine vessel running controlling apparatus 20. When either of the parallel movement buttons 18L and 18R is depressed, the control mode transitions from the ordinary running mode to the parallel movement mode under certain conditions. The parallel movement buttons 18L and 18R are configured such that just one of either can be depressed.

Figure 4:
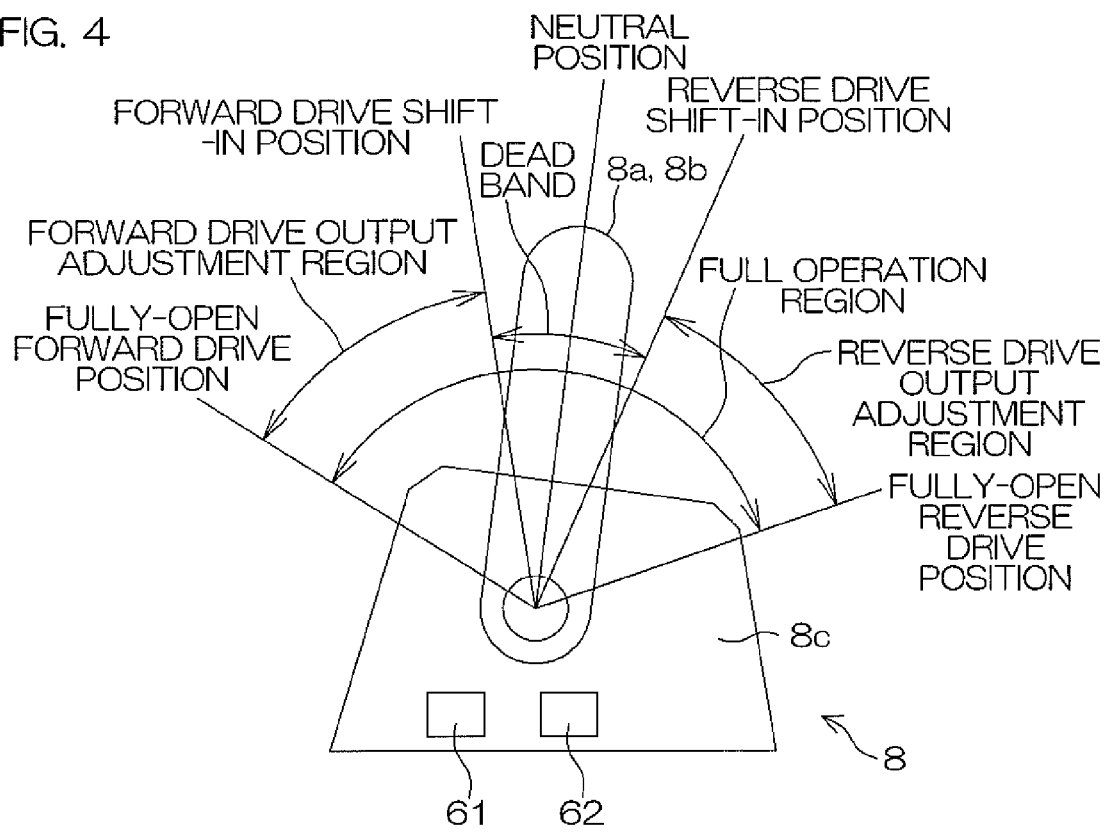
FIG. 4 is a side view for explaining operation positions of throttle levers.

FIG. 4 is a side view for explaining operation positions of the throttle levers 8a and 8b. In the respective neutral positions, the throttle levers 8a and 8b rise substantially upright from the main body 8c. Each of the throttle levers 8a and 8b can be operated to incline (swing) within the predetermined angular range that is centered at the neutral position and has a fully-open forward drive position as a forward side end and a fully-open reverse drive position as a reverse side end. The throttle levers 8a and 8b can be operated independent of each other. Inclination amounts $L_{xL}$ and $L_{xR}$ of the throttle levers 8a and 8b are respectively detected and provided to the marine vessel running controlling apparatus 20 by a first position sensor 61 and a second position sensor 62 that are disposed in the main body 8c. The first and second position sensors 61 and 62 may preferably include potentiometers, for example.

When the throttle levers 8a and 8b are inclined forward by predetermined amounts from the neutral positions, the inclination positions of the throttle lever 8a and 8b are at forward drive shift-in positions. That is, when, in the ordinary running mode, the throttle levers 8a and 8b are inclined forward to the forward drive shift-in positions, the marine vessel running controlling apparatus 20 changes the target shift positions of the outboard motors 11 and 12 from the neutral positions to the forward drive positions. When the throttle levers 8a and 8b are inclined in the reverse direction by predetermined amounts from the neutral positions, the inclination positions of the throttle levers 8a and 8b are at reverse drive shift-in positions. That is, when, in the ordinary running mode, the throttle levers 8a and 8b are inclined in the reverse direction to the reverse drive shift-in position, the marine vessel running controlling apparatus 20 changes the target shift positions of the outboard motors 11 and 12 from the neutral positions to the reverse drive positions. When the throttle levers 8a and 8b are positioned in between the forward drive shift-in positions and the reverse drive shift-in positions, the marine vessel running controlling apparatus 20 sets the target shift positions to the neutral positions and sets the target engine speeds to idle speeds. In this state, propulsive forces are not generated from the outboard motors 11 and 12 because the driving force of each engine 39 is not transmitted to the corresponding propeller 40. The operation regions between the respective forward drive shift-in positions and the reverse drive shift-in positions are dead bands that are not involved in the generation of the propulsive force.

When each of the throttle levers 8a and 8b is inclined further forward beyond the forward drive shift-in position and toward the fully-open forward drive position, the marine vessel running controlling apparatus 20 increases the target engine speed as the inclination amount is increased. The forward drive side operation region beyond the forward drive shift-in position is thus a forward drive output adjustment region. Likewise, when each of the throttle levers 8a and 8b is inclined further in the reverse direction beyond the reverse drive shift-in position and toward the fully-open reverse drive position, the marine vessel running controlling apparatus 20 increases the target engine speed as the inclination amount is increased. The reverse drive side operation region beyond the reverse drive shift-in position is thus a reverse drive output adjustment region. The magnitudes of the propulsive forces in the forward drive direction or the reverse drive direction that are generated by the outboard motors 11 and 12 can thus be adjusted by the operations of the throttle levers 8a and 8b.

Though unillustrated, the main body 8c preferably includes a provisional holding mechanism arranged to provisionally hold the throttle levers 8a and 8b respectively at the neutral position, the forward drive shift-in position, and the reverse drive shift-in position. Such a provisional holding unit may include notches that provisionally hold movable members that move along with the throttle levers 8a and 8b. With such a configuration, when the throttle lever 8a or 8b reaches the neutral position, the forward drive shift-in position, or the reverse drive shift-in position, the throttle lever 8a or 8b is held at that position and becomes unable to be moved by a light force. The operator can thus obtain a clicking feeling at each of the neutral position, the forward drive shift-in position, and the reverse drive shift-in position. The operator can thus readily recognize the neutral position, the forward drive shift-in position, and the reverse drive shift-in position.

Figure 5:
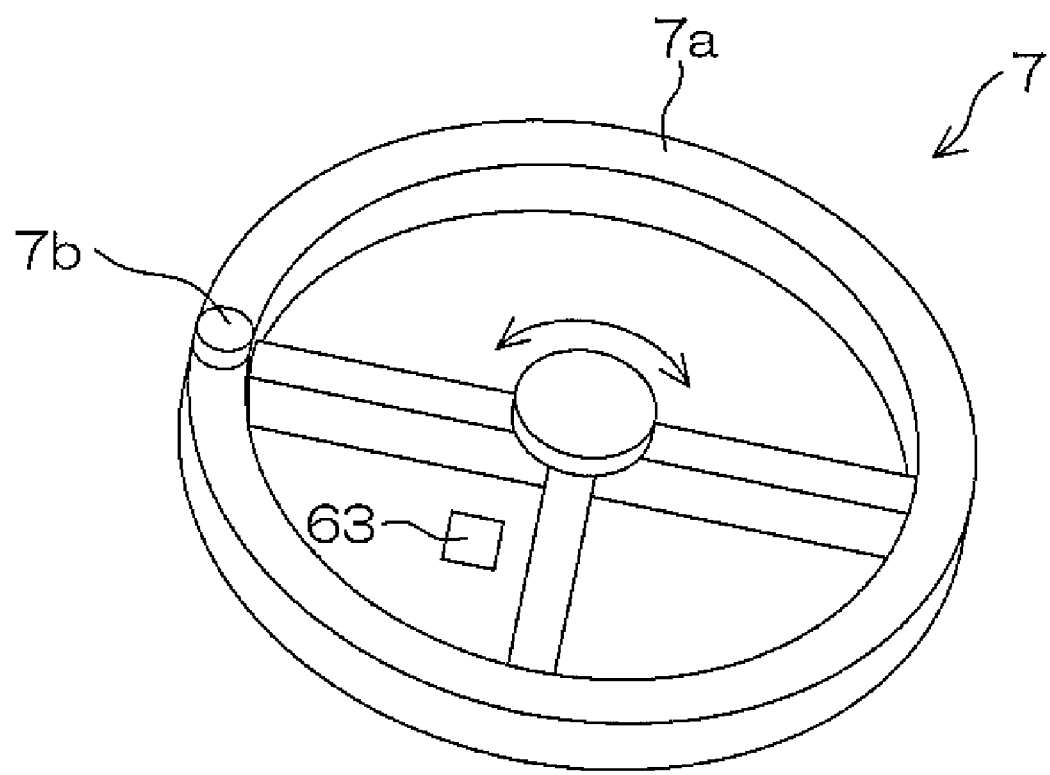
FIG. 5 is a schematic perspective view of a steering operational section.

FIG. 5 is a schematic perspective view of the steering operational section 7. The steering operational section 7 includes a steering handle 7a and a turning button 7b. In the present preferred embodiment, the turning button 7b is a push button disposed on the steering handle 7a. The turning button 7b may be disposed at a position enabling operation by the thumb of the hand that holds the steering handle 7a (the left hand in the example of FIG. 5). The operator can thus operate the steering handle 7a and the turning button 7b simultaneously. In the example of FIG. 5, the turning button 7b can be operated by the left thumb while holding the steering handle 7a by the left hand, and the throttle operating section 8 can thus be operated by the right hand at the same. A rotation operation position of the steering handle 7a is detected by a third position sensor 63. The third position sensor 63 may preferably include a potentiometer, for example. The detection signal of the third position sensor 63 and the operation signal of the turning button 7b are supplied to the marine vessel running controlling apparatus 20.

In the ordinary running mode, the marine vessel running controlling apparatus 20 sets the target steering angle according to the rotation operation position of the steering handle 7a. The steering mechanisms 50 of the outboard motors 11 and 12 are controlled according to the target steering angle. Steering control can thus be performed by operation of the steering handle 7a.

In the parallel movement mode, on the other hand, when the steering handle 7a is operated while depressing the turning button 7b, the marine vessel running controlling apparatus 20 sets a target yaw moment in accordance with the operation amount of the steering handle 7a. More specifically, the target yaw moment is set to correspond to a relative operation amount and a relative operation direction of the steering handle 7a after depressing of the turning button 7b.

Figure 6:
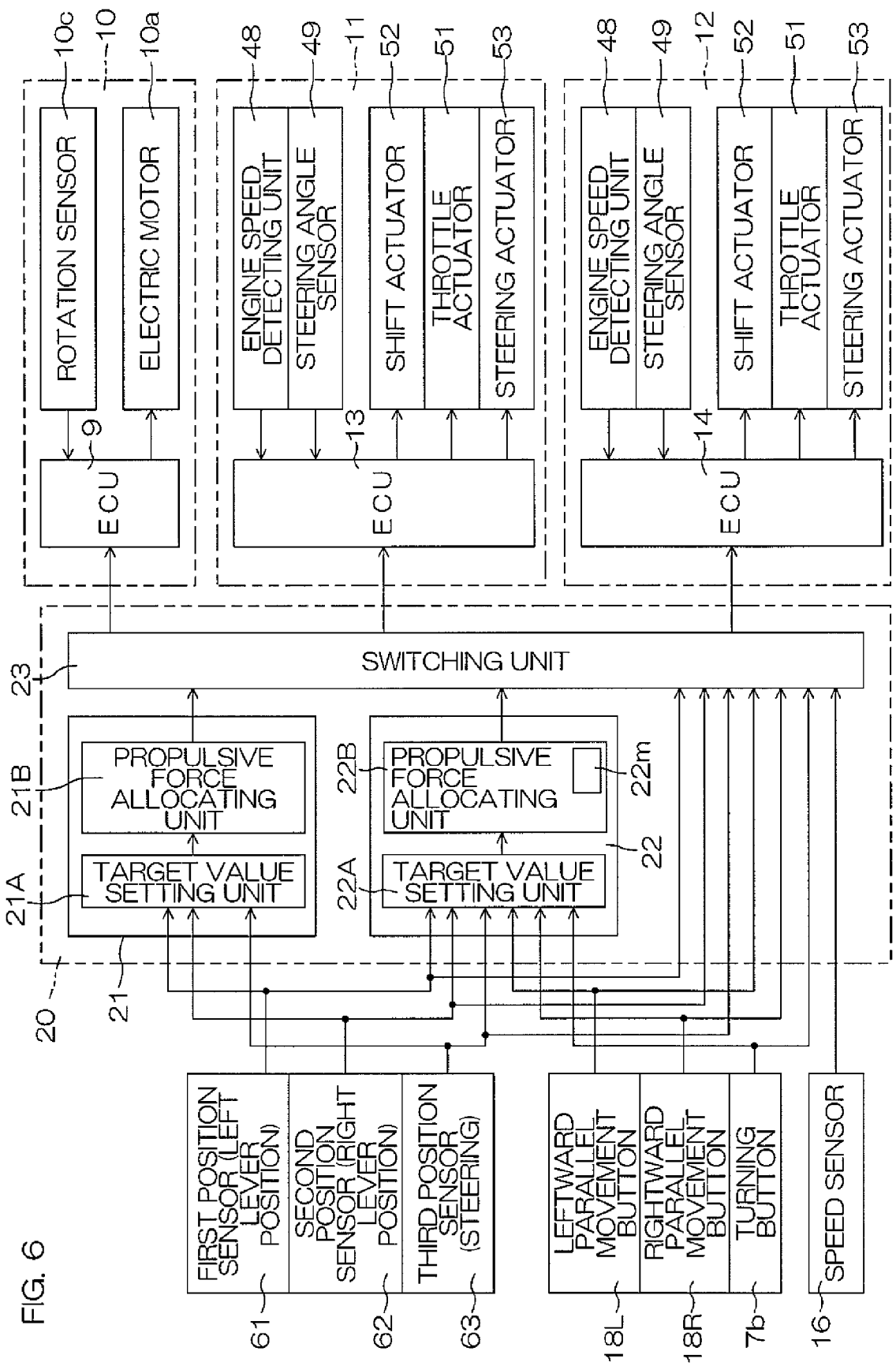
FIG. 6 is a block diagram for explaining an electrical configuration of principal portions of the marine vessel.

FIG. 6 is a block diagram for explaining an electrical configuration of principal portions of the marine vessel 1. The marine vessel running controlling apparatus 20 includes a microcomputer, which includes a CPU (central processing unit) and a memory and performs predetermined software-based processes to function virtually as a plurality of functional processing units. The functional processing units include first and second target value computing sections 21 and 22, and a switching unit 23. The first target value computing section 21 computes target values for the ordinary running mode. The second target value computing section 22 computes target values for the parallel movement mode. In accordance with the operation states of the parallel movement buttons 18L and 18R, the turning button 7b, and the throttle levers 8a and 8b, the switching unit 23 selects the target values computed by either of the first and second target value computing sections 21 and 22. The target values selected by the switching unit 23 are provided to the ECU 9 for the bow thruster 10, the outboard motor ECU 13 for the portside outboard motor 11, and the outboard motor ECU 14 for the starboard side outboard motor 12.

The bow thruster 10 preferably includes the electric motor 10a, which drives the propeller 10b, and a rotation sensor 10c, which detects the rotation speed of the electric motor 10a (that is, the rotation speed of the propeller 10b). The marine vessel running controlling apparatus 20 provides the target values, including the target rotation direction and the target rotation speed, to the ECU 9. The ECU 9 uses the rotation signal fed back from the rotation sensor 10c to perform feedback control of the electric motor 10a based on the target rotation direction and the target rotation speed.

The ECUs 13 and 14 of the outboard motors 11 and 12 control the corresponding throttle actuators 51, shift actuators 52, and steering actuators 53 in accordance with the target values provided by the marine vessel running controlling apparatus 20. The target values in this case include the target shift position, the target engine speed, and the target steering angle. The engine speeds detected by the engine speed detecting units 48 and the steering angles detected by the steering angle sensors 49 are input into the ECUs 13 and 14. Each of the ECUs 13 and 14 controls the throttle actuator 51 such that the engine speed detected by the engine speed detecting unit 48 matches the target engine speed. Each of the ECUs 13 and 14 also controls (for example, performs PD (proportional differential) control of) the steering actuator 53 such that the steering angle detected by the steering angle sensor 49 matches the target steering angle.

The first target value computing section 21 includes a target value setting unit 21A and a propulsive force allocating unit 21B. The target value setting unit 21A generates the target shift positions and the target engine speeds of the portside and starboard side outboard motors 11 and 12 according to the operations of the left and right throttle levers 8a and 8b in the forward/reverse direction. The target value setting unit 21A also generates the target steering angle according to the rotation operation of the steering handle 7a.

The target values (target shift positions, target engine speeds, and target steering angles) generated by the target value setting unit 21A are allocated by the propulsive force allocating unit 21B among the outboard motor ECUs 13 and 14 corresponding to the portside and starboard side outboard motors 11 and 12. With regard to the electric motor 10a of the bow thruster 10, the propulsive force allocating unit 21B sets the target rotation speed thereof to zero.

The target value setting unit 21A generates the target shift positions and the target engine speeds according to the inclination amounts of the left and right throttle levers 8a and 8b in the forward/reverse direction that are detected by the first and second position sensors 61 and 62.

More specifically, when the inclination amount of the left side throttle lever 8a in the forward direction is not less than a value corresponding to the forward drive shift-in position, the target value setting unit 21A sets the target shift position of the portside outboard motor 11 to the forward drive position. When the throttle lever 8a is inclined further forward beyond the forward drive shift-in position, the target value setting unit 21A sets a higher target engine speed the larger the inclination amount. Likewise, when the inclination amount of the throttle lever 8a in the reverse direction is not less than a value corresponding to the reverse drive shift-in position, the target value setting unit 21A sets the target shift position of the portside outboard motor 11 to the reverse drive position. When the throttle lever 8a is inclined further in the reverse direction beyond the reverse drive shift-in position, the target value setting unit 21A sets a higher target engine speed the larger the inclination amount. When the inclination position of the throttle lever 8a in the forward/reverse direction does not reach either of the forward drive shift-in position and the reverse drive shift-in position, the target value setting unit 21A sets the target shift position of the portside outboard motor 11 to the neutral position. Further, when the inclination position of the throttle lever 8a is within a range between the forward drive shift-in position and the reverse drive shift-in position, the target value setting unit 21A sets the target engine speed to the idle speed.

The target value setting unit 21A performs a similar process with respect to the operation position of the right side throttle lever 8b that is detected by the second position sensor 62. That is, the target shift position and the target engine speed of the starboard side outboard motor 12 are set according to the operation position of the right side throttle lever 8b.

The target shift positions and the target engine speeds that have thus been set individually for the left and right outboard motors 11 and 12 are supplied to the outboard motor ECUs 13 and 14 respectively by the propulsive force allocating unit 21B.

The target value setting unit 21A also sets the target steering angle according to a handle steering angle (rotation operation amount and rotation direction) of the steering handle 7a that is detected by the third position sensor 62. Specifically, in response to a rotation operation of the steering handle 7a in the rightward direction from the neutral position, a target steering angle for rightward turning is set. Likewise, in response to a rotation operation of the steering handle 7a in the leftward direction from the neutral position, a target steering angle for leftward turning is set. In either case, the absolute value of the target steering angle (deflection angle from a neutral position) is set higher the larger the rotation operation amount from the neutral position. The target steering angle that is thus set is provided in common to the outboard motors ECUs 13 and 14 by the propulsive force allocating unit 21B.

The steering angles of the portside outboard motor 11 and the starboard side outboard motor 12 are thus controlled to be mutually equal in value.

The second target value computing section 22 includes a target value setting unit 22A and a propulsive force allocating unit 22B. The target value setting unit 22A sets the target values in response to operations of the left and right throttle levers 8a and 8b, the steering handle 7a, the parallel movement buttons 18L and 18R, and the turning button 7b. The target values in this case include the target propulsive force, the target heading direction, and the target yaw moment that are to be made to act on the entirety of the marine vessel 1. Details of the target value setting will be described later.

The propulsive force allocating unit 22B computes, in accordance with the target values set by the target value setting unit 22A, the individual target values expressing the respective propulsive forces to be generated by the propulsion systems 10 to 12 and the directions of the propulsive forces. That is, in regard to the bow thruster 10, the propulsive force allocating unit 22B computes the target rotation direction and the target rotation speed. In regard to each of the outboard motors 11 and 12, the propulsive force allocating unit 22B computes the target shift position, the target engine speed, and the target steering angle. In this case, the target values provided to the outboard motors 11 and 12 are generally not equal to each other.

The switching unit 23 switches the control mode in accordance with the operation positions of the throttle levers 8a and 8b, the steering angle of the steering handle 7a, the operation signals from the parallel movement buttons 18L and 18R and the turning button 7b, and the speed of the marine vessel 1 detected by the speed sensor 16. The switching unit 23 switches the control mode between the ordinary running mode and the parallel movement mode. In the ordinary running mode, the computation results of the first target value computing section 21 are selected. In the parallel movement mode, on the other hand, the computation results of the second target value computing section 22 are selected. The computation results (target values) selected by the switching unit 23 are sent to the ECUs 9, 13, and 14 of the bow thruster 10, the portside outboard motor 11, and the starboard side outboard motor 12.

FIG. 7 is a flowchart for explaining the selection of the control mode (actions of the switching unit 23). The initial control mode is set to the ordinary running mode. That is, the switching unit 23 selects the target values computed by the first target value computing section 21 and provides the selected values to the propulsion systems 10 to 12.

The marine vessel running controlling apparatus 20 references the operation signals of the parallel movement buttons 18L and 18R and the turning button 7b and the operation signals of the throttle levers 8a and 8b (detection signals of the first and second sensors 61 and 62). More specifically, the marine vessel running controlling apparatus 20 judges whether or not any of the parallel movement buttons 18L and 18R and the turning button 7b is operated (steps S1 and S2). Further, the marine vessel running controlling apparatus 20 judges whether the left and right throttle levers 8a and 8b are operated to mutually opposite shift-in positions (step S3). That is, an affirmative judgment is made in this step if the left side throttle lever 8a is at the forward drive shift-in position and the right side throttle lever 8b is at the reverse drive shift-in position. An affirmative judgment is also made in step S3 if the left side throttle lever 8a is at the reverse drive shift-in position and the right side throttle lever 8b is at the forward drive shift-in position. If none of the buttons 18L, 18R, and 7b is operated (steps S1 and S2: NO) and the throttle levers 8a and 8b are not at mutually opposite shift-in positions (step S3: NO), the marine vessel running controlling apparatus 20 selects the ordinary running mode (step S4).

If an affirmative judgment is made in any of steps S1 to S3, the marine vessel running controlling apparatus 20 selects the parallel movement mode under the condition that all of prohibition conditions 1 to 5 (steps S5 to S9) to be described below are negated (step S10). If any of the prohibition conditions 1 to 5 is affirmed (step S5 to S9: YES), the marine vessel running controlling apparatus 20 invalidates the operation for transition to the parallel movement mode (steps S1 to S3). In this case, the marine vessel running controlling apparatus 20 selects the ordinary running mode (step S4).

Prohibition condition 1 (step S5): The operation position of either of the throttle levers 8a and 8b is at the forward drive output adjustment region or the reverse drive output adjustment region. If the operation position of the throttle lever 8a or 8b is at the forward drive output adjustment region or the reverse drive output adjustment region, it can be considered that the operator is intending high-speed movement of the marine vessel 1. Thus, in this case, the marine vessel running controlling apparatus 20 prohibits the transition to the parallel movement mode.

Prohibition condition 2 (step S6): A forward drive speed is equal to or more than a predetermined forward drive speed threshold. The forward drive speed is the absolute value of the speed in the forward drive direction. The forward drive speed threshold is preferably set, for example, to about 4 km/h. A case in which the operator returns the throttle lever 8a or 8b to a shift-in position or to the neutral position during running at high speed may be considered. In this case, the marine vessel 1 runs for a while by inertia. In this case, the marine vessel running controlling apparatus 20 prohibits the transition to the parallel movement mode until the speed falls sufficiently.

Prohibition condition 3 (step S7): A reverse drive speed is equal to or more than a predetermined reverse drive speed threshold. The reverse drive speed is the absolute value of the speed in the reverse drive direction. The reverse drive speed threshold is preferably set, for example, to about 2 km/h. This prohibition condition 3 is a condition similar to prohibition condition 2. That is, in a case in which the marine vessel 1 is running at high speed by inertia, the marine vessel running controlling apparatus 20 prohibits the transition to the parallel movement mode until the speed falls sufficiently.

Prohibition condition 4 (step S8): The handle steering angle is equal to or more than a predetermined steering angle threshold. When the handle steering angle takes on a value near a maximum steering angle (operation end) of the steering handle 7a, there is a possibility that control of turning by the operation of the steering handle 7a can be performed only in one direction. The marine vessel running controlling apparatus 20 thus prohibits the transition to the parallel movement mode when the absolute value of the handle steering angle detected by the third position sensor 63 is not less than the steering angle threshold. Here it is assumed, for example, that the maximum handle steering angles of the steering handle 7a is ±180 degrees. In this case, the steering angle threshold may preferably be set to 135 degrees to enable handle operation of ±45 degrees for turning control, for example.

Prohibition condition 5 (step S9): The engine speed is equal to or more than a predetermined threshold. When the control mode is switched in a state of high engine speed, sudden change of the engine speed and sudden change of the propulsion direction may occur. The marine vessel running controlling apparatus 20 thus prohibits transition to the parallel movement mode when the engine speed of either of the outboard motors 11 and 12 is not less than the threshold (for example, about 2000 rpm). The outboard motor ECUs 13 and 14 perform cooperative control of the shift actuators 52 and the throttle actuators 51 such that shifting in and shifting out are performed at favorable timings.

Arrangements may be made to notify the operator on the invalidation of the operation for the transition to the parallel movement mode when any of the prohibition conditions (step S5 to S9) applies in a case where an operation satisfying a condition of transition to the parallel movement mode (steps S1 to S3) is performed. Such notification may be performed by providing a notifying unit that includes an indicator (for example, an indicator lamp) or an alarm sound generator, etc., and by controlling the notifying unit via the marine vessel running controlling apparatus 20.

FIG. 8 is a diagram for explaining the setting of target values and the behavior of the marine vessel in the parallel movement mode.

An operation in a case where the leftward parallel movement button 18L is pressed will first be described. If both the left and right throttle levers 8a and 8b are at the neutral position, the marine vessel running controlling apparatus 20 sets the leftward direction as the target movement direction and computes the target values for leftward parallel movement (right-angle lateral movement). If both the left and right throttle levers 8a and 8b are at the forward drive shift-in position, the marine vessel running controlling apparatus 20 sets a diagonally forward left direction (for example, a direction forming an angle of 45 degrees with respect to the central line of the marine vessel 1) as the target movement direction and computes the target values for making the marine vessel 1 undergo parallel movement in this direction. If both the left and right throttle levers 8a and 8b are at the reverse drive shift-in position, the marine vessel running controlling apparatus 20 sets a diagonally backward left direction (for example, a direction forming an angle of approximately 45 degrees with respect to the central line of the marine vessel 1) as the target movement direction. The marine vessel running controlling apparatus 20 then computes the target values for making the marine vessel 1 undergo parallel movement in this direction.

The operation performed when the rightward parallel movement button 18R is pressed is similar. That is, if both the left and right throttle levers 8a and 8b are at the neutral position, the marine vessel running controlling apparatus 20 sets the rightward direction as the target movement direction and computes the target values for rightward parallel movement (right-angle lateral movement). If both the left and right throttle levers 8a and 8b are at the forward drive shift-in position, the marine vessel running controlling apparatus 20 sets a diagonally forward right direction (for example, a direction forming an angle of approximately 45 degrees with respect to the central line of the marine vessel 1) as the target movement direction and computes the target values for making the marine vessel 1 undergo parallel movement in this direction. If both the left and right throttle levers 8a and 8b are at the reverse drive shift-in position, the marine vessel running controlling apparatus 20 sets a diagonally backward right direction (for example, a direction forming an angle of approximately 45 degrees with respect to the central line of the marine vessel 1) as the target movement direction. The marine vessel running controlling apparatus 20 then computes the target values for making the marine vessel 1 undergo parallel movement in this direction.

An operation in a case where the left and right throttle levers 8a and 8b are at mutually opposite shift-in positions will now be described. In a case where the operation position of the left side throttle lever 8a is at the forward drive shift-in position and the operation position of the right side throttle lever 8b is at the reverse drive shift-in position, the marine vessel running controlling apparatus 20 computes the target values for making the marine vessel 1 turn rightward (clockwise) on the spot (the spot the marine vessel 1 is currently located). Oppositely, in a case where the operation position of the left side throttle lever 8a is at the reverse drive shift-in position and the operation position of the right side throttle lever 8b is at the forward drive shift-in position, the marine vessel running controlling apparatus 20 computes the target values for making the marine vessel 1 turn leftward (counterclockwise) on the spot. In both cases, the target values for the propulsion systems 10 to 12 may be computed such that the target yaw moment becomes equal to a fixed value that is determined in advance.

If when neither of the parallel movement buttons 18L and 18R is operated, and both of the left and right throttle levers 8a and 8b are at the forward drive shift-in position, the control mode is set to the ordinary running mode. In this case, the marine vessel running controlling apparatus 20 sets the target values for dead-slow forward drive. Likewise, if when neither of the parallel movement buttons 18L and 18R is operated, and both of the left and right throttle levers 8a and 8b are at the reverse drive shift-in position, the control mode is set to the ordinary running mode. In this case, the marine vessel running controlling apparatus 20 sets the target values for dead-slow reverse drive.

When the turning button 7b is pressed, the marine vessel running controlling apparatus 20 switches to the parallel movement mode regardless of the positions of the throttle levers 8a and 8b. That is, the turning control by the operation of the turning button 7b and the steering handle 7a has priority over the operation of setting the throttle levers 8a and 8b at mutually opposite shift-in positions. The turning of the marine vessel 1 by the turning button 7b and the steering handle 7a may take place on the spot or may take place in parallel with parallel movement.

Here, it is assumed that the operator operates the leftward parallel movement button 18L, operates both of the throttle levers 8a and 8b to the forward drive shift-in position, and performs a turning operation by the turning button 7b and the steering handle 7a. In this case, the marine vessel running controlling apparatus 20 sets the target movement direction of the marine vessel 1 to the diagonally forward left direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement in the diagonally forward left direction. Next, it is assumed that the operator operates the leftward parallel movement button 18L, operates both of the throttle levers 8a and 8b to the neutral position, and performs a turning operation by the turning button 7b and the steering handle 7a. In this case, the marine vessel running controlling apparatus 20 sets the target movement direction of the marine vessel 1 to the leftward direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement (right-angle lateral movement) to the left. Further, it is assumed that the operator operates the leftward parallel movement button 18L, operates both of the throttle levers 8a and 8b to the reverse drive shift-in position, and performs a turning operation by the turning button 7b and the steering handle 7a. In this case, the marine vessel running controlling apparatus 20 sets the target movement direction of the marine vessel 1 to the diagonally backward left direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement in the diagonally backward left direction.

Likewise, it is assumed that the operator operates the rightward parallel movement button 18R, operates both of the throttle levers 8a and 8b to the forward drive shift-in position, and performs a turning operation by the turning button 7b and the steering handle 7a. In this case, the marine vessel running controlling apparatus 20 sets the target movement direction of the marine vessel 1 to the diagonally forward right direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement in the diagonally forward right direction. Next, it is assumed that the operator operates the rightward parallel movement button 18R, operates both of the throttle levers 8a and 8b to the neutral position, and performs a turning operation by the turning button 7b and the steering handle 7a. In this case, the marine vessel running controlling apparatus 20 sets the target movement direction of the marine vessel 1 to the rightward direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement (right-angle lateral movement) to the right. Further, it is assumed that the operator operates the rightward parallel movement button 18R, operates both of the throttle levers 8a and 8b to the reverse drive shift-in position, and performs a turning operation by the turning button 7b and the steering handle 7a. In this case, the marine vessel running controlling apparatus 20 sets the target movement direction of the marine vessel 1 to the diagonally backward right direction and sets the target yaw moment according to the operation of the steering handle 7a. The marine vessel running controlling apparatus 20 computes the target values for the propulsion systems 10 to 12 according to this target movement direction and target yaw moment. The marine vessel 1 thus turns while undergoing parallel movement in the diagonally backward right direction.

The movement directions of the marine vessel/due to parallel movement (rectilinear movement of the instantaneous center of rotation) are the eight directions of forward, reverse, leftward, rightward, diagonally forward left, diagonally backward left, diagonally forward right, and diagonally backward right. The marine vessel 1 thus cannot undergo parallel movement in an arbitrary direction. However, because minimum propulsive forces of the outboard motors 11 and 12 are limited by the idle speed, a synthetic propulsive force in any direction cannot necessarily be obtained by balancing of the propulsive forces. Thus, if in a case where an operational unit capable of commanding parallel movement in an arbitrary direction is provided, and a parallel movement in a commanded direction is actually impossible, the marine vessel exhibits behavior that differs from the intention of the operator, resulting in a cause of uncomfortable feeling. Thus, the configuration of the present preferred embodiment, with which the directions of parallel movement are restricted to eight directions, does not present a problem in terms of practical use but rather can be said to be a preferable configuration in being unlikely to cause an uncomfortable feeling.

Setting of the target values in the ordinary running mode will now be described.

Here, the inclination amounts $L_{xL}$ and $L_{xR}$ of the throttle levers 8a and 8b in the forward drive and the reverse drive direction are provided with plus signs in the case of inclination in the forward direction and with minus signs in the case of inclination in the reverse direction. The target value setting unit 21A of the first target value computing section 21 sets the target engine speeds $n_L$ and $n_R$ for the portside and starboard side outboard motors 11 and 12 with respect to the inclination amounts $L_{xL}$ and $L_{xR}$ corresponding to operation positions further in the forward direction beyond the forward drive shift-in position or further in the reverse direction beyond the reverse drive shift-in position. Specifically, the target value setting unit 21A sets the target engine speeds $n_L$ and $n_R$ by: $n_L = c_x \times L_{xL}$ and $n_R = c_x \times L_x R$. Here, the target engine speeds $n_L$ and $n_R$ are provided with plus signs in the case of forward drive rotation and with minus signs in the case of reverse drive rotation. $c_x$ is a coefficient (for example, a constant). Further, the target value setting unit 21A sets the target steering angle $\delta_d$ according to the handle steering angle (rotation operation amount) $L_z$ of the steering handle 7a and by: $\delta_d = c_z \times L_z$. Here, $c_z$ is a coefficient (for example, a constant), and, for example, the handle steering angle $L_z$ is provided with a plus sign in the case of a rightward operation and with a minus sign in the case of a leftward operation. The target steering angle $\delta_d$ is thus provided with a plus sign in the case of rightward steering and a minus sign in the case of leftward steering.

The propulsive force allocating unit 21B of the first target value computing section 21 sets the target rotation speed of the bow thruster 10 to zero and sends the engine speed $n_L$ of the portside outboard motor 11 and the target engine speed $n_R$ of the starboard side outboard motor 12 to the outboard motor ECUs 13 and 14, respectively. The propulsive force allocating unit 21B also sets the target steering angle $\delta_L$ of the portside outboard motor 11 and the target steering angle $\delta_R$ of the starboard side outboard motor 12 such that $\delta_L = \delta_R = \delta_d$. Thus, in the ordinary running mode, while the bow thruster 10 is put in a stopped state, the portside and starboard side outboard motors 11 and 12 are made equal in steering angle and are made to respectively generate propulsive forces in accordance with the operation of the throttle levers 8a and 8b.

Setting of the target values in the parallel movement mode will now be described.

With the present preferred embodiment, in the parallel movement mode, the steering angles of the outboard motors 11 and 12 are set to fixed values that are determined in advance. For example, the second target value computing section 22 fixes the target steering angle $\delta_L$ of the portside outboard motor 11 to $-\pi/6$ (rad) and fixes the target steering angle $\delta_R$ of the starboard side outboard motor 12 to $\pi/6$ (rad). The steering angle $\delta_F$ (the direction of the propulsive force generated by the propeller) of the bow thruster 10 is mechanically fixed at $\pi/2$ (rad). Here, the "steering angle" is the deflection angle of the propeller rotation axial line with respect to the central line 5 (see FIG. 1) of the hull 2, with the direction from the bow to the stern being 0 degree, an angle in a leftward (counterclockwise) rotation direction with respect to 0 degree being positive, and an angle in a rightward (clockwise) rotation direction with respect to 0 degree being negative. In regard to the bow thruster 10, the propeller rotation axial line extends in the rightward direction from the propeller 10b, and in regard to the outboard motors 11 and 12, the propeller rotation axial lines extend to the rear of the marine vessel in directions away from the corresponding outboard motors.

The heading direction and the turning angular speed of the marine vessel 1 in the parallel movement mode are mostly adjusted by the propeller rotation directions and propeller rotation speeds (that is, the directions and the magnitudes of the propulsive forces) of the bow thruster 10 and the outboard motors 11 and 12.

The target value setting unit 22A of the second target value computing section 22 determines the forward/reverse direction target thrust (propulsive force) $F_{dx}=c_x \times L_x$ according to an operation position $L_x$ of the throttle levers 8a and 8b. Here, the coefficient $c_x$ takes a value that differs from that in the ordinary running mode. The operation position $L_x$ takes a value in common for the left and right throttle levers 8a and 8b, with $L_x=1$ being allocated for the forward drive shift-in position, $L_x=0$ being allocated for the neutral position, and $L_x=-1$ being allocated for the reverse drive shift-in position.

The target value setting unit 22A also determines the rightward/leftward direction target thrust (propulsive force) $F_{dy}=c_y \times L_y$ in accordance with the operation state $L_y$ of the left and right parallel movement buttons 18L and 18R. Here, the value of the operation state $L_y$ is such that $L_y=1$ when the rightward parallel movement button 18R is operated, $L_y=0$ when neither of the parallel movement buttons 18L and 18R is operated, and $L_y=-1$ when the leftward parallel movement button 18L is operated. Further, the target value setting unit 22A determines the target yaw moment $M_{dz}=c_z \times L_z'$ for turning the marine vessel 1 in accordance with a relative rotation operation amount (relative steering amount) $L_z'$. Here, $c_y$ is a coefficient (constant) The relative rotation operation amount $L_z'$ is a relative handle steering angle (relative rotation operation amount) of the steering handle 7a with respect to an initial handle steering angle (initial rotation operation amount) $L_{z0}$ that is detected by the third position sensor 63 when the operation of the turning button 7b is started. That is, the relative rotation operation amount $L_z'$ is expressed as: $L_z'=L_z-L_{z0}$ using the handle steering angle (absolute rotation operation amount) $L_z$ detected by the third position sensor 63.

Figure 9A:
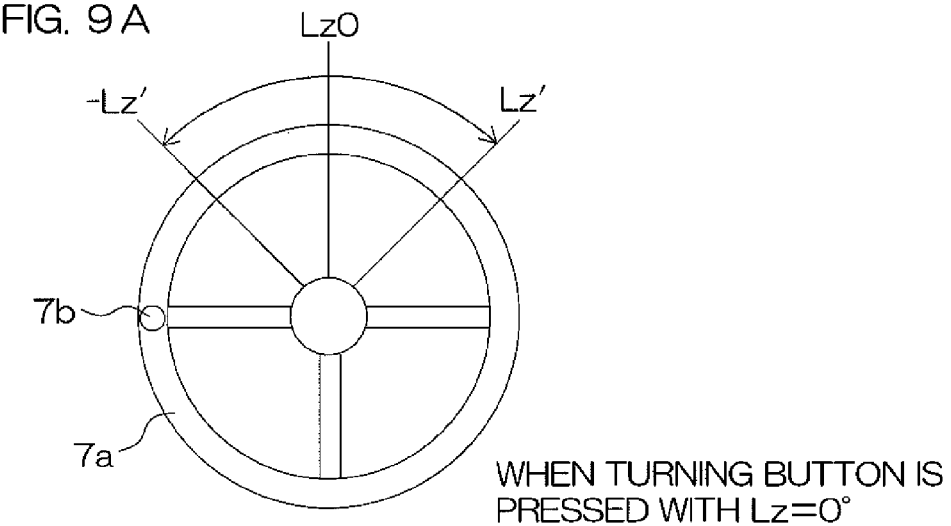
FIGS. 9A, 9B, and 9C are diagrams for explaining a turning control operation by a turning button and a steering handle.
Figure 9B:
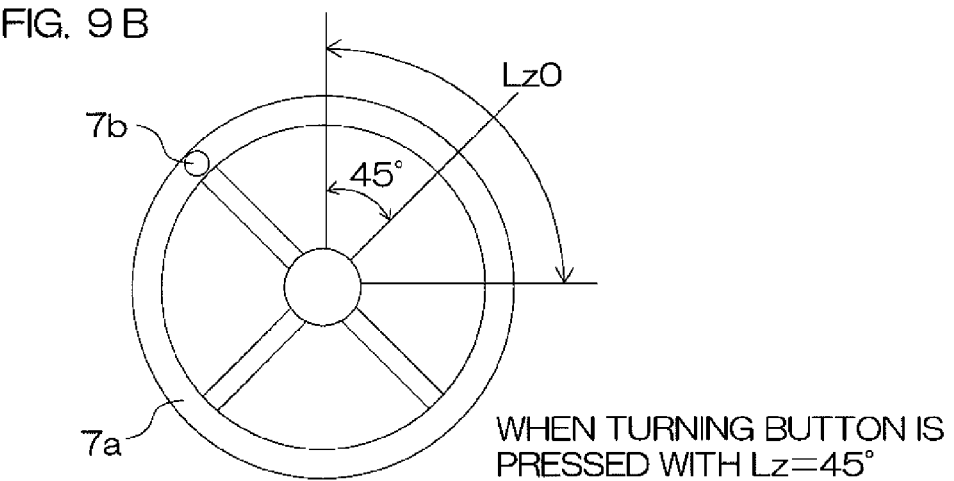
Figure 9C:
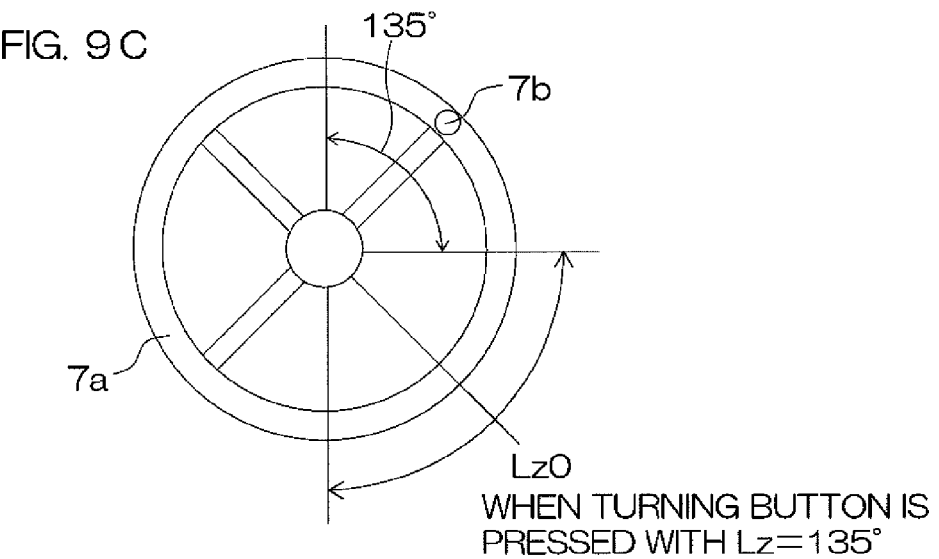

More specifically, when the turning button 7b is pressed, the target value setting unit 22A stores the output of the third position sensor 63 at that point in a memory (not shown) and sets this as the initial handle steering angle $L_{z0}$ as shown in FIGS. 9A to 9C. When the steering handle 7a is rotated while the turning button 7b is being pressed, the target value setting unit 22A determines the relative rotation operation amount (relative handle steering angle) $L_z'=L_z-L_{z0}$ based on the output of the third position sensor 63 (the current handle steering amount $L_z$) Based on the relative rotation operation amount $L_z'$, the target value setting unit 22A determines the target yaw moment $M_{dz}$ (target torque). FIG. 9A shows the circumstances in a case where the initial handle steering angle $L_{z0}$ is approximately 0 degrees (steering angle neutral position), FIG. 9B shows the circumstances in a case where the initial handle steering angle $L_{z0}$ is approximately 45 degrees, and FIG. 9C shows the circumstances in a case where the initial handle steering angle $L_{z0}$ is approximately 135 degrees. When the full steering angle range is within ±180 degrees from the steering angle neutral position, relative steering by 45 degrees to the rightward direction or the leftward direction cannot be secured in a region where the absolute handle steering angle value from the steering angle neutral position exceeds approximately 135 degrees, for example. In this case, the transition to the parallel movement mode is prohibited as mentioned above (see step S8 in FIG. 7).

When the turning button 7b is not pressed, the target value setting unit 22A determines the value $L_z'$ according to the operation positions of the throttle levers 8a and 8b. That is, when the left and right throttle levers 8a and 8b are at the same position, $L_z'=0$. If the left side throttle lever 8a is at the forward drive shift-in position and right-side throttle lever 8b is at the reverse drive shift-in position, $L_z'=1$. Further, if the left side throttle lever 8a is at the reverse drive shift-in position and right-side throttle lever 8b is at the forward drive shift-in position, $L_z'=-1$. Using the value $L_z'$ thus determined, the target value setting unit 22A determines the target yaw moment $M_{dz}=c_z \times L_z'$. That the left and right throttle levers 8a and 8b are at mutually opposite shift-in positions can be determined based on non-matching of the signs of the shift-in positions detected by the first and second position sensors 61 and 62.

Based on the target values $F_{dx}$, $F_{dy}$, and $M_{dz}$ thus determined, the individual propulsive forces that are to be generated by the bow thruster 10 and the outboard motors 11 and 12 are determined by the propulsive force allocating unit 22B.

Figure 10:
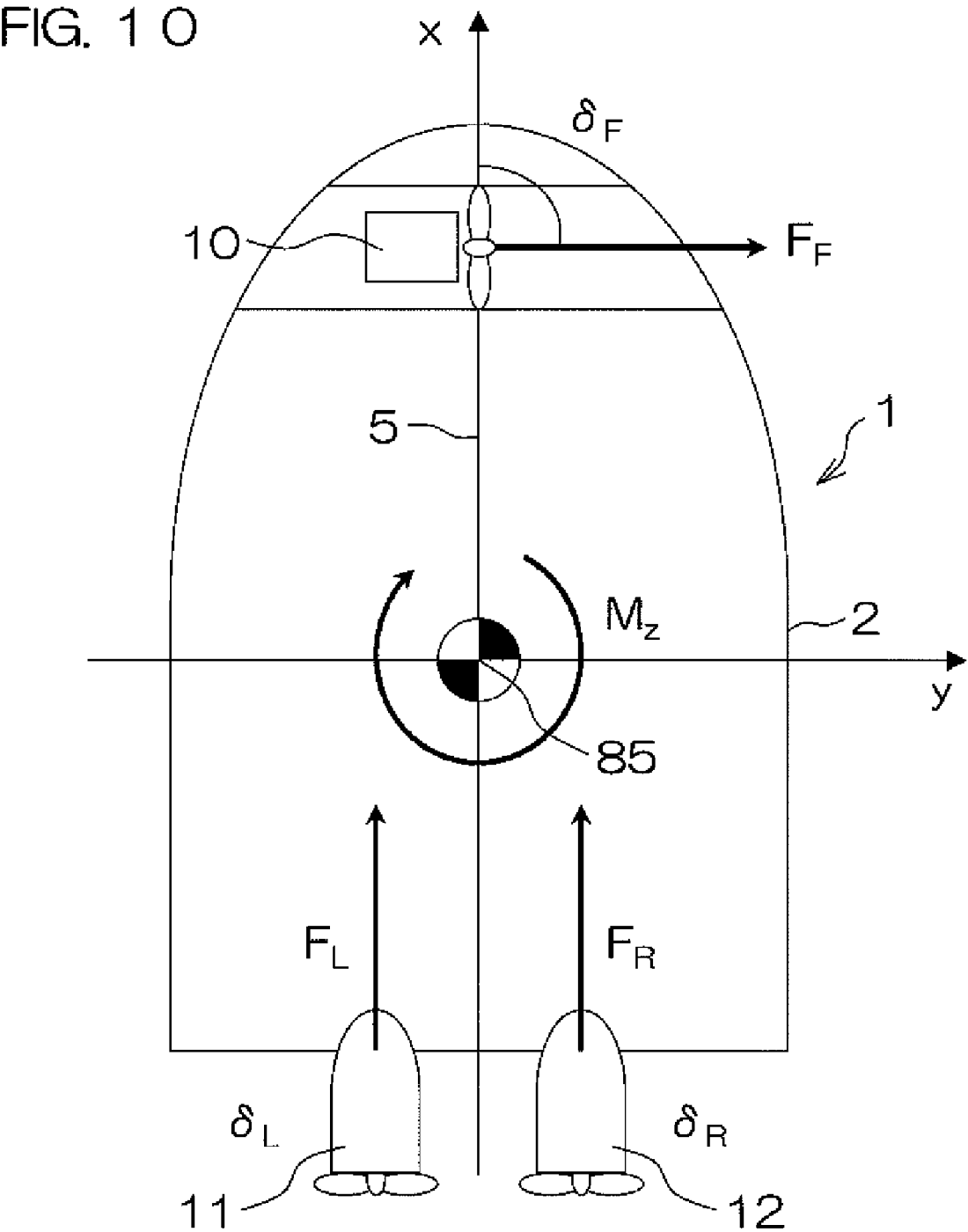
FIG. 10 is a diagram for explaining a hull coordinate system.

The actions of the propulsive force allocating unit 22B is now to be explained in more detail. For the explanation, the following symbols are introduced:

$F_F$: thrust output by the bow thruster
$F_L$: thrust output by the portside outboard motor
$F_R$: thrust output by the starboard side outboard motor
$(x_F, y_F)$: position of the bow thruster in a hull coordinate system
$(x_L, y_L)$: position of the portside outboard motor in the hull coordinate system
$(x_R, y_R)$: position of the starboard side outboard motor in the hull coordinate system
$\delta_F$: target steering angle of the bow thruster
$\delta_L$: target steering angle of the portside outboard motor
$\delta_R$: target steering angle of the starboard side outboard motor The "hull coordinate system" is a coordinate system with an origin set at an instantaneous rotation center 80 of the marine vessel 1, an x-axis taken along the central line 5, and a y-axis taken along a horizontal direction (rightward/leftward direction) orthogonal to the x-axis as shown in FIG. 10.

When the propulsive force and moment for control are expressed as $\tau=[F_{dx}\, F_{dy}\, M_{dz}]^T$ (where T indicates transposition of a matrix or vector) and the propulsive forces to be output by the respective propulsion systems 10, 11 and 12 are expressed as $f=[F_F\, F_L\, F_R]^T$, f is calculated using the following control allocation matrix $T(\delta)$:

$$f=T(\delta)^{-1}\tau \quad (1)$$

The control allocation matrix $T(\delta)$ is expressed as follows:

$$T(\delta)=[T_F\, T_L\, T_R] \quad (2)$$

$$T_F=[\cos\delta_F\, \sin\delta_F\, x_F\sin\delta_F-y_F\cos\delta_F]^T \quad (3)$$

$$T_L=[\cos\delta_L\, \sin\delta_L\, x_L\sin\delta_L-y_L\cos\delta_L]^T \quad (4)$$

$$T_R=[\cos\delta_R\, \sin\delta_R\, x_R\sin\delta_R-y_R\cos\delta_R]^T \quad (5)$$

As mentioned above, in the present preferred embodiment, $\delta_F=\pi/2$ (rad), $\delta_L=-\pi/6$ (rad), and $\delta_R=\pi/6$ (rad). The sesettings are merely exemplary and, in general, the settings may be determined such that $T(\delta)$ has an inverse matrix $T(\delta)^{-1}$ and there is no need to use fixed values.

The target thrust $F_d=f$ and the target steering angles $\delta_d=[\delta_F\, \delta_L\, \delta_R]^T$ are thus determined by the propulsive force allocating unit 22B. Further, the propulsive force allocating unit 22B determines the target rotation speed $n_F$ of the bow thruster 10 and the target engine speeds $n_L$ and $n_R$ of the outboard motors 11 and 12 from the target thrust $F_d$. The sign of the target rotation speed $n_F$ expresses the target rotation direction of the electric motor 10a of the bow thruster 10. The signs of the target engine speeds $n_L$ and $n_R$ express the target shift positions of the outboard motors 11 and 12. The target values, $n_F$, $n_L$, $n_R$, $\delta_F$, $\delta_L$, and $\delta_R$ thus determined are allocated to the ECUs 9, 13, and 14 of the corresponding propulsion systems 10, 11, and 12.

The thrust T generated by a propeller is obtained by the following formula:

$$T=\rho D^4 K_T(J) n |n| \quad (6)$$

In the above, $\rho$ is the density of water, D is a propeller diameter, n is a propeller rotation speed, and J is an advance ratio that is given by the following formula:

$$J=u/(nD) \quad (7)$$

u is a speed of a propeller wake flow (speed of the marine vessel; this can be regarded as being virtually zero in the case of the bow thruster 10). $K_T$ is a thrust coefficient, which is a function of the advance ratio J and is determined by actual measurement or simulation. Thus, if the current speed of the propeller wake flow and the propeller rotation speed are known, the currently generated thrust and torque can be obtained.

The propulsive force allocating unit 22B of the second target value computing section 22 includes a map 22m (see FIG. 6). The map 22m stores the thrust coefficient $K_T(J)$ corresponding to various values of the speed of the marine vessel 1 and the propeller rotation speeds for each of the bow thruster 10 and the outboard motors 11 and 12.

The propulsive force allocating unit 22B determines the thrust coefficient $K_T$ by referencing the map 22m using the speed of the marine vessel 1 detected by the speed sensor 16, the current propeller rotation speed provided from the ECU 9, and the current engine speeds provided from the ECUs 13 and 14. The propulsive force allocating unit 22B further uses the thrust coefficient $K_T$ to determine the target rotation speeds $n_F$, $n_L$, and $n_R$ of the respective propulsion systems 10 to 12 corresponding to the target thrust $F_d$ from Formula (6).

The ECU 9 of the bow thruster 10 executes feedback control (for example, PID (proportional integral differential) control) of the electric motor 10a such that the propeller rotation speed (rotation speed of the electric motor) matches the target rotation speed $n_F$. The ECUs 13 and 14 of the outboard motors 11 and 12 perform feedback control (for example, PID control) of the throttle actuators 51 such that the propeller rotation speeds (engine speeds) match the target rotation speeds $n_L$ and $n_R$.

As described above, with the present preferred embodiment, the steering operational section 7 and the throttle operational section 8 can be used in common in both the ordinary running mode and the parallel movement mode. The operator thus does not have to exchange operational systems in accordance with the control mode. Operations during departure from port and return to port can thereby be performed easily. Further, an operational system can be shared for the ordinary running mode and the parallel movement mode, thus enabling the configuration of the entire operational system to be simplified and the cost to be reduced and the installation space of the operational system to be reduced accordingly.

Figure 11:
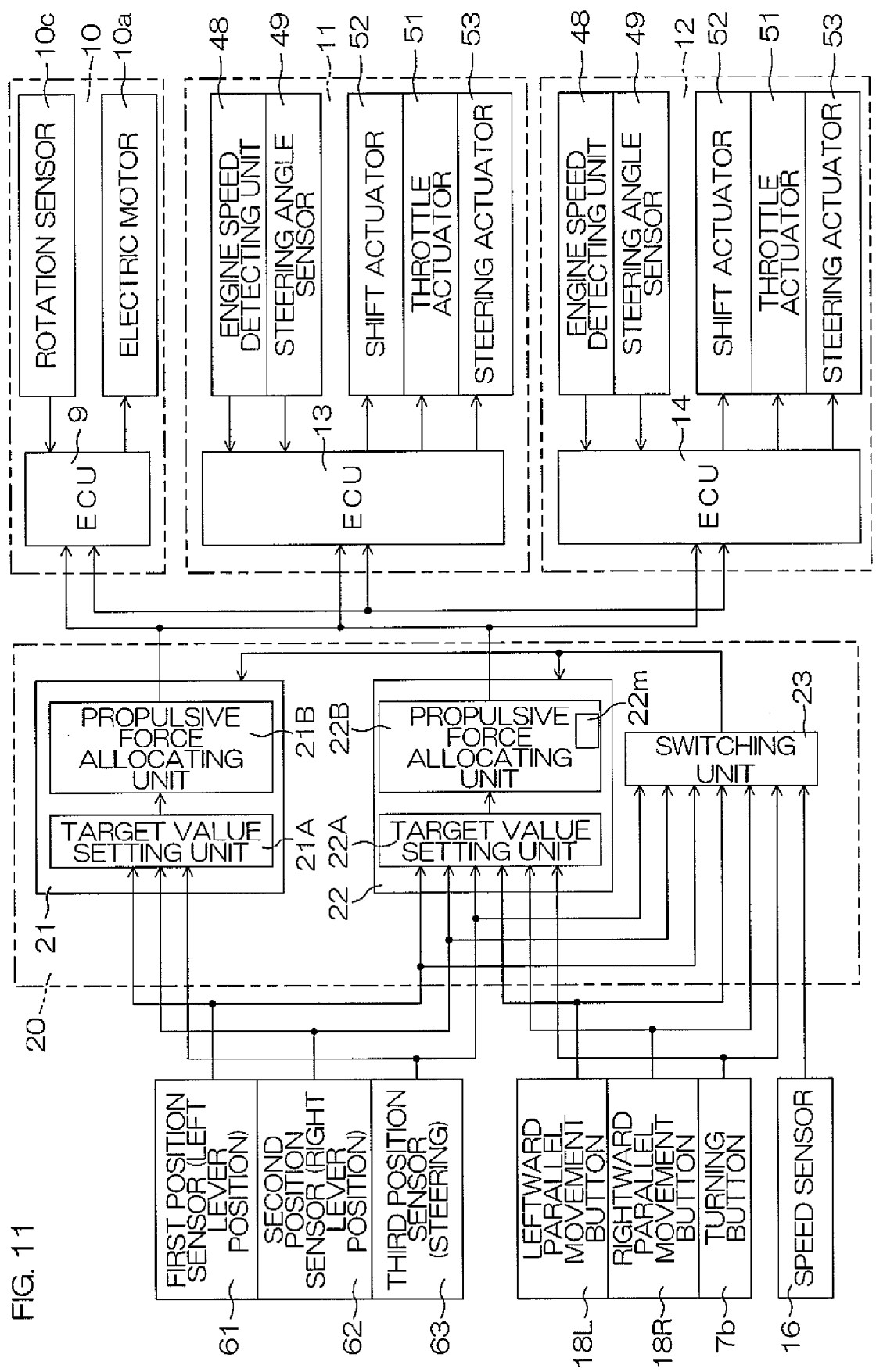
FIG. 11 is a block diagram of an electrical configuration of principal portions of a marine vessel according to another preferred embodiment of the present invention.

FIG. 11 is a block diagram of an electrical configuration of principal portions of a marine vessel according to another preferred embodiment of the present invention. In FIG. 11, portions equivalent to the respective portions shown in FIG. 6 described above are provided with the same reference symbols. In the preferred embodiment described above, the switching unit 23 which switches the control mode is configured to select the computation results (target values) of either of the first and second target value computing sections 21 and 22, and supply the computation results to the propulsion systems 10 to 12. On the other hand, with the present preferred embodiment, the switching unit 23 activates one of either of the first and second target value computing sections 21 and 22, and puts the other unit in a non-activated state. The target values generated by one of the target value computing section 21 and 22 that is in the activated state are supplied to the propulsion systems 10 to 12. The same actions and advantages as those of the first preferred embodiment described above can be achieved with this configuration as well.

While the preferred embodiments of the present invention have thus been described, the present invention may be embodied in other ways. For example, although in the preferred embodiments described above, the target rotation speed of the electric motor or the engine is computed as the target value related to the output of the propulsion system, a target throttle opening, a target thrust, a target speed, etc., may be used instead. Also, although in the preferred embodiments described above, the target steering angle is preferably computed as the target value related to the turning of the marine vessel, a target yaw angular speed may be used instead.

In the process shown in FIG. 7, the judgments using the speed of the marine vessel 1 (steps S6 and S7) may be omitted. This is so because the condition that the engine speed is not less than the predetermined threshold is used as one of the conditions for prohibiting the transition to the parallel movement mode (step S9).

Also, an indicator (for example, an indicator lamp) that displays whether the current control mode is the ordinary running mode or the parallel movement mode may be provided. Such an indicator may be disposed on the control console 6.

Also, although with the above-described preferred embodiments, the turning button 7b is preferably disposed on the steering handle 7a, the turning button may be disposed at another location. Further, there is no need for the leftward and rightward parallel movement buttons 18L and 18R to be disposed on the left side throttle lever 8a. For example, the parallel movement buttons 18L and 18R may be disposed on the right side throttle lever 8b. Or, the leftward parallel movement button 18L may be disposed on the left side throttle lever 8a with the rightward parallel movement button 18R being disposed on the right side throttle lever 8b. Further, the parallel movement buttons may be disposed on the main body 8c of the throttle operational section 8. Also, for a skilled operator, the parallel movement mode is not necessarily needed, and thus cover members for covering the turning button and/or the parallel movement buttons may be provided.

Further, although with the preferred embodiments described above, the bow thruster 10 and the outboard motors 11 and 12 are preferably provided as the propulsion systems, the bow thruster 10 does not necessarily have to be provided. That is, marine vessel maneuvering in the parallel movement mode may be realized by making use of a balance of the propulsive forces generated by the pair of outboard motors 11 and 12.

It is possible to apply various design changes besides the above within a scope of the claims.

The correspondence between the terms used in the "SUMMARY OF THE INVENTION" section and the terms used in the above description of the preferred embodiments is shown below as a non-limiting example:
propulsion system: bow thruster 10, outboard motors 11 and 12
steering mechanism: steering mechanism 50 marine vessel: marine vessel 1
first operational unit: throttle levers 8a, 8b
second operational unit: parallel movement buttons 18L, 18R
target value computing unit: first and second target value computing sections 21 and 22
switching unit: switching unit 23
control unit: ECUs 9, 13, and 14
selection output unit: switching unit 23 (FIG. 6)
selecting and activating unit: switching unit 23 (FIG. 11)
leftward movement operational element: leftward parallel movement button 18L
rightward movement operational element: rightward parallel movement button 18R
left operational element: left side throttle lever 8a
right operational element: right side throttle lever 8b
speed detecting unit: speed sensor 16
turning operational unit: turning button 7b
steering handle: steering handle 7a
hull: hull 2
marine vessel maneuvering supporting apparatus: steering operational section 7, throttle operational section 8, speed sensor 16, marine vessel running controlling apparatus 20

While the present invention has been described in detail by way of the preferred embodiments thereof, it should be understood that these preferred embodiments are merely illustrative of the technical principles of the present invention but not limitative of the present invention. The spirit and scope of the present invention are to be limited only by the appended claims.

This application corresponds to Japanese Patent Application No. 2008-309862 filed in the Japanese Patent Office on Dec. 4, 2008, the disclosure of which is incorporated herein by reference.

What is claimed is:

1. A marine vessel maneuvering supporting apparatus for a marine vessel which includes a propulsion system and a steering mechanism, the marine vessel maneuvering supporting apparatus comprising:
    a first operational unit arranged to select a forward drive position for forward drive of the propulsion system, a reverse drive position for reverse drive of the propulsion system, and a neutral position for an inactive state of the propulsion system;
    a second operational unit arranged to command rightward and leftward movement of the marine vessel; and
    a target value computing unit arranged to determine target values including a target propulsive force for the propulsion system and a target steering angle for the steering mechanism, such that the marine vessel undergoes parallel movement in a direction that is in accordance with an operation position of the first operational unit when rightward or leftward movement is commanded by the second operational unit.

2. The marine vessel maneuvering supporting apparatus according to claim 1, wherein the second operational unit includes a leftward movement operational element used for commanding movement in a leftward direction and a rightward movement operational element used for commanding movement in a rightward direction, and
    the target value computing unit is arranged to determine the target values for parallel or substantially parallel movement in a direction that is in accordance with a combination of operations of the leftward movement operational element and the rightward movement operational element and the operation position of the first operational unit.

3. The marine vessel maneuvering supporting apparatus according to claim 1, wherein the marine vessel maneuvering supporting apparatus is arranged to generate target values corresponding to a pair of right and left propulsion systems provided in the marine vessel and a pair of steering mechanisms which respectively correspond to the propulsion systems, and
    the first operational unit includes a left operational element corresponding to the left propulsion system and a right operational element corresponding to the right propulsion system, the left operational element and the right operational element respectively being arranged to be operated to a forward drive position, a reverse drive position, and a neutral position, and
    the target value computing unit is arranged to determine target values for turning the marine vessel at a current point when operation positions of the left operational element and the right operational element are a combination of the forward drive position and the reverse drive position.

4. The marine vessel maneuvering supporting apparatus according to claim 1, wherein the target value computing unit is arranged to invalidate the command by the second operational unit and determine the target values according to an operational amount of the first operational unit when the operation amount from the neutral position of the first operational unit exceeds a predetermined amount.

5. The marine vessel maneuvering supporting apparatus according to claim 1, further comprising a speed detecting unit arranged to detect a speed of the marine vessel, wherein the target value computing unit is arranged to determine the target values upon invalidating the command by the second operational unit when the speed of the marine vessel detected by the speed detecting unit is not less than a predetermined speed threshold.

6. The marine vessel maneuvering supporting apparatus according to claim 1, further comprising a turning operational unit used for causing the marine vessel turn during parallel or substantially parallel movement of the marine vessel, wherein the target value computing unit is arranged to determine the target values such that the marine vessel turns while undergoing parallel or substantially parallel movement in the direction that is in accordance with the operation position of the first operational unit when the rightward or leftward movement is commanded by the second operational unit.

7. The marine vessel maneuvering supporting apparatus according to claim 6, wherein the turning operational unit is disposed on a steering handle used for controlling the steering angle of the steering mechanism.

8. The marine vessel maneuvering supporting apparatus according to claim 7, wherein the target value computing unit is arranged to determine a target turning value during parallel movement in accordance with an operation amount of the steering handle and determine the target values according to the target turning value.

9. The marine vessel maneuvering supporting apparatus according to claim 7, wherein the target value computing unit is arranged to invalidate the command by the turning operational unit when a handle steering angle of the steering handle is not less than a predetermined steering angle threshold.

10. A marine vessel comprising:
    a hull;
    a propulsion system and a steering mechanism attached to the hull; and
    a marine vessel maneuvering supporting apparatus that is arranged to determine target values for the propulsion system and the steering mechanism;

the marine vessel maneuvering supporting apparatus including:

a first operational unit arranged to select a forward drive position for forward drive of the propulsion system, a reverse drive position for reverse drive of the propulsion system, and a neutral position for an inactive state of the propulsion system;

a second operational unit arranged to command rightward and leftward movement of the marine vessel; and a target value computing unit arranged to determine target value including a target propulsive force for the propulsion system and a target steering angle for the steering mechanism, such that the marine vessel undergoes parallel or substantially parallel movement in a direction that is in accordance with an operation position of the first operational unit when rightward or leftward movement is commanded by the second operational unit.

11. The marine vessel according to claim 10, wherein the second operational unit includes a leftward movement operational element used for commanding movement in a leftward direction and a rightward movement operational element used for commanding movement in a rightward direction, and the target value computing unit is arranged to determine the target values for parallel or substantially parallel movement in a direction that is in accordance with a combination of operations of the leftward movement operational element and the rightward movement operational element and the operation position of the first operational unit.

12. The marine vessel according to claim 10, further comprising a pair of the propulsion systems which are right and left propulsion systems, and a pair of the steering mechanisms associated with the right and left propulsion systems; wherein the marine vessel maneuvering supporting apparatus is arranged to generate target values corresponding to the pair of right and left propulsion systems and the pair of steering mechanisms, the first operational unit includes a left operational element corresponding to the left propulsion system and a right operational element corresponding to the right propulsion system, the left operational element and the right operational element respectively being arranged to be operated to a forward drive position, a reverse drive position, and a neutral position, and the target value computing unit is arranged to determine target values for turning the marine vessel at a current point when operation positions of the left operational element and the right operational element are a combination of the forward drive position and the reverse drive position.

13. The marine vessel according to claim 10, wherein the target value computing unit is arranged to invalidate the command by the second operational unit and determine the target values according to an operational amount of the first operational unit when the operation amount from the neutral position of the first operational unit exceeds a predetermined amount.

14. The marine vessel according to claim 10, further comprising a speed detecting unit arranged to detect a speed of the marine vessel, wherein the target value computing unit is arranged to determine the target values upon invalidating the command by the second operational unit when the speed of the marine vessel detected by the speed detecting unit is not less than a predetermined speed threshold.

15. The marine vessel according to claim 10, further comprising a turning operational unit used for making the marine vessel turn during parallel movement of the marine vessel, wherein the target value computing unit is arranged to determine the target values such that the marine vessel turns while undergoing parallel movement in the direction that is in accordance with the operation position of the first operational unit when the rightward or leftward movement is commanded by the second operational unit.

16. The marine vessel according to claim 15, wherein the turning operational unit is disposed on a steering handle used for controlling the steering angle of the steering mechanism.

17. The marine vessel according to claim 16, wherein the target value computing unit is arranged to determine a target turning value during parallel or substantially parallel movement in accordance with an operation amount of the steering handle and to determine the target values according to the target turning value.

18. The marine vessel according to claim 16, wherein the target value computing unit is arranged to invalidate the command by the turning operational unit when a handle steering angle of the steering handle is not less than a predetermined steering angle threshold.

* * * * *